United States Patent
Seo et al.

(10) Patent No.: US 8,855,821 B2
(45) Date of Patent: Oct. 7, 2014

(54) ROBOT AND CONTROL METHOD THEREOF

(75) Inventors: Kee Hong Seo, Seoul (KR); Joo Hyung Kim, Seongnam-si (KR); Kyung Shik Roh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 311 days.

(21) Appl. No.: 13/483,697

(22) Filed: May 30, 2012

(65) Prior Publication Data

US 2012/0310412 A1 Dec. 6, 2012

(30) Foreign Application Priority Data

May 30, 2011 (KR) .......... 10-2011-0051239
May 25, 2012 (KR) .......... 10-2012-0056131

(51) Int. Cl.
*G05B 19/04* (2006.01)
*G05B 15/00* (2006.01)
*B25J 9/00* (2006.01)
*G06N 3/00* (2006.01)

(52) U.S. Cl.
CPC *B25J 9/0006* (2013.01); *B25J 9/00* (2013.01); *G06N 3/008* (2013.01); *Y10S 901/01* (2013.01); *Y10S 901/48* (2013.01)
USPC ........... 700/254; 700/250; 700/253; 700/258; 700/260; 700/261; 700/262; 700/263; 901/1; 901/48

(58) Field of Classification Search
CPC .......... B25J 9/0006; B25J 9/00; B25J 19/005; B25J 9/1628; B25J 9/02; B25J 17/00; B25J 18/00; B25J 9/1671; B62D 57/00; B62D 57/02–57/032; G06N 3/008; G06F 19/00; G05B 15/00; G05B 19/04; G05B 2219/39299; G05B 2219/39184; G05B 2219/40461; G05B 2219/37342; G05D 2201/0217; Y10S 901/01; A63H 11/18

See application file for complete search history.

(56) References Cited

U.S. PATENT DOCUMENTS

| | | | |
|---|---|---|---|
| 6,064,167 A * | 5/2000 | Takenaka et al. | 318/568.12 |
| 7,324,872 B2 * | 1/2008 | Nagasaka | 700/245 |
| 8,112,179 B2 * | 2/2012 | Nakajima | 700/261 |
| 8,140,189 B2 * | 3/2012 | Nagasaka | 700/262 |
| 8,340,822 B2 * | 12/2012 | Nagasaka | 700/260 |
| 8,428,780 B2 * | 4/2013 | Orita | 700/254 |
| 8,463,433 B2 * | 6/2013 | Nagasaka | 700/245 |
| 8,612,053 B2 * | 12/2013 | Orita et al. | 700/260 |
| 8,612,054 B2 * | 12/2013 | Kwon | 700/261 |
| 2007/0118252 A1 * | 5/2007 | Okazaki et al. | 700/254 |
| 2009/0299523 A1 * | 12/2009 | Kim et al. | 700/245 |
| 2010/0206651 A1 * | 8/2010 | Nagasaka | 180/218 |

* cited by examiner

*Primary Examiner* — Khoi Tran
*Assistant Examiner* — Bao Long T Nguyen
(74) *Attorney, Agent, or Firm* — Staas & Halsey LLP

(57) ABSTRACT

A bipedal robot having a pair of legs with 6 degrees of freedom and a control method thereof which calculate a capture point by combining the position and velocity of the center of gravity (COG) and control the capture point during walking to stably control walking of the robot. A Finite State Machine (FSM) is configured to execute a motion similar to walking of a human, and thus the robot naturally walks without constraint that the knees be bent all the time, thereby being capable of walking with a large stride and effectively using energy required while walking.

38 Claims, 11 Drawing Sheets

ROBOT AND CONTROL METHOD THEREOF

CROSS-REFERENCE TO RELATED APPLICATIONS

This application claims the priority benefit of Korean Patent Application No. 10-2011-0051239, filed on May 30, 2011 in the Korean Intellectual Property Office and Korean Patent Application No. 10-2012-0056131, filed on May 25, 2012 in the Korean Intellectual Property Office, the disclosure of both of which is incorporated herein by reference.

BACKGROUND

1. Field

Example embodiments of the following disclosure relate to a robot and a control method thereof which control stable walking of the robot in which respective joints are operated by torque servos.

2. Description of the Related Art

In general, walking control technology of a robot which walks with two legs in a similar manner as a human is achieved by controlling joints connecting respective parts of the robot. As control methods of respective joints, there are methods of controlling angles of joints and methods of controlling torques of joints.

In one method of controlling angles of joints, the angles of the respective joints are calculated using inverse kinematics so that a zero moment point (ZMP) is located within a support polygon formed by contact points between feet of a robot and the ground, the respective joints being controlled to maintain the calculated angles. A representative one of the methods of controlling torques of joints is regarded as a passive dynamic walking method, and in this case, the direction of gravity applied to the entirety of a robot is determined as if the robot is placed on an inclined plane, and torques required by the respective joints are generated based on this direction.

In the method of controlling angles of joints, a value of the inverse kinematics is present only if knees of the robot are bent during calculation of the inverse kinematics. However, if the robot walks while bending the knees thereof, a stride is reduced and energy consumption is increased, and thus walking efficiency is lowered.

Further, in the passive dynamic walking method, analysis of walking of the robot in a three-dimensional space is complicated, and thus, two-dimensional walking of the robot is implemented, or even if three-dimensional walking of the robot is implemented, the walking of the robot is not stable and is not natural like walking of a human.

SUMMARY

Therefore, it is an aspect of the present disclosure to provide a robot which may walk while stretching knees thereof, implement three-dimensional walking, and naturally and stably walk in the same manner as a human, and a control method thereof.

Additional aspects of the disclosure will be set forth in part in the description which follows and, in part, will be obvious from the description, or may be learned by practice of the disclosure.

In accordance with one aspect of the present disclosure, a robot provided with a plurality of legs each having a plurality of joint parts and an upper body connected to the legs while having a plurality degrees of freedom, the robot including a sensor unit to measure state information of the robot, a kinematics calculation unit to acquire a current pose of the robot using the state information of the robot measured by the sensor unit, a target setting unit to set a target pose with respect to at least one of the plurality of degrees of freedom of the robot based on a finite state machine (FSM) of the robot that is set in advance, a compensation force calculation unit to calculate a pose error by comparing the current pose with the target pose and calculate a compensation force with respect to the at least one degree of freedom based on the pose error, a virtual gravity setting unit to set sizes of virtual gravities required by the plurality of joint parts of the robot according to the calculated compensation force and sizes of virtual gravities required by the plurality of joint parts of the robot according to a current state of the FSM of the robot, a gravity compensation torque calculation unit to calculate gravity compensation torques required to compensate for the virtual gravities set by the virtual gravity setting unit; and a servo control unit to output the gravity compensation torques to the plurality of joint parts.

The sensor unit includes a pose detection unit to detect a pose angle of the upper body; and an angle detection unit to detect an angle of the plurality of joint parts.

The kinematics calculation unit calculates a center of gravity (COG) based on the pose angle of the upper body and the angle of the plurality of joint parts, and acquires the current pose based on the COG.

The kinematics calculation unit calculates a position and velocity of the COG based on the pose angle of the upper body and the angle of the plurality of joint parts, and acquires the current pose by calculating a current capture point based on the position and velocity of the COG.

The kinematics calculation unit acquires a position of a reference point of a hip or the upper body based on the pose angle of the upper body and the angle of the plurality of joint parts, and acquires the current pose based on the position of the reference point.

The target setting unit sets a target COG with respect to the at least one degree of freedom; and set the target pose using the target COG.

The target setting unit sets a target capture point with respect to the at least one degree of freedom and set the target pose using the target capture point.

The target setting unit sets the target capture point as a point on a line which passes in a direction of gravity starting from a point within a range supported against a foot of the plurality of legs.

Target setting unit sets a target position of the reference point of the hip or the upper body of the robot with respect to the at least one degree of freedom, and sets the target pose based the target position of the reference point.

The kinematics calculation unit further acquires a current hip height of the robot based on the pose angle of the upper body and the angle of the plurality of joint parts, and the compensation force calculation unit calculates a capture point error by comparing the current capture point with the target capture point, calculates a hip height error by comparing the current hip height with a target hip height and calculates the compensation force based on the capture point error and the hip height error.

The compensation hip calculating unit calculates a horizontal direction compensation force using the capture point error and calculates a vertical direction compensation force using the hip height error.

The pose angle acquired by the pose detection unit includes at least one of a rotation angle in the roll direction (rotated about the X-axis), a rotation angle of in the pitch direction (rotated about the Y-axis) and a rotation angle in the yaw direction (rotated about the Z-axis) of the pelvis link of the robot, and the robot further includes a joint torque detection unit to measure torques of the plurality of joint parts.

The kinematics calculation unit calculates a position of the current capture point of the robot by calculating a position and velocity of a current COG and a current hip height of the robot and combining the position and velocity of the COG.

The robot further includes an FSM control unit to store the FSM of the robot in advance, to judge a current state of the FSM of the robot and to control transition from the current state to the next state of the FSM according to whether or not the robot satisfies an FSM state transition condition.

The target setting unit sets a target capture point based on a current FSM state of the robot, a target pose angle for controlling the upper body of the robot and a target hip height of the robot.

The robot further includes a compensation moment calculation unit to calculate compensation moments required to reach the target pose angle using a difference between the pose angle measured by the sensor unit and the target pose angle set by the target setting unit.

The compensation force calculation unit calculates a compensation force in the X and Y directions using differences between positions of the current capture point in the X and Y directions calculated by the kinematics calculation unit and positions of the target capture point in the X and Y direction set by the target setting unit, and calculates compensation force in the Z direction using a difference between the current hip height of the robot calculated by the kinematics calculation unit and the target hip height of the robot set by the target setting unit.

The virtual gravity setting unit sets a size of a virtual gravity according to the current state of the FSM of the robot and a size of a virtual gravity according to the compensation force calculated by the compensation force calculation unit.

The virtual gravity setting unit includes a first virtual gravity setting unit to set first virtual gravity required by the respective joints of the robot using Equation 2 below, if $g_f$ represents the first virtual gravity, m represents the mass of the robot and f represents the compensation force calculated by the compensation force calculation unit; and a second virtual gravity setting unit to set second virtual gravity required by the respective joints according to the current state of the FSM of the robot, $$g_f = f/m.$$ [Equation 2]

The gravity compensation torque calculation unit calculates a torque required to compensate for the first virtual gravity, the second virtual gravity and actual gravity.

The robot further includes a weight distribution unit to calculate distance rates between a projection point of the COG of the robot on the ground and the feet connected to the respective legs, and to allot a larger rate of the mass of the upper body of the robot to a leg closer to the projection point of the COG of the robot on the ground using the calculated distance rates.

The gravity compensation torque calculation unit calculates a gravity compensation torque to the first virtual gravity and a gravity compensation torque to the second virtual gravity using the mass of the upper body distributed to the respective legs by the weight distribution unit, and adjusts rates of the gravity compensation torque to the first virtual gravity and the gravity compensation torque to the second virtual gravity according to the current state of the FSM of the robot, thereby calculating gravity compensation torques of the respective joints required to compensate for virtual gravities and actual gravity.

The robot further includes a compensation moment distribution unit to calculate distance rates between a projection point of the COG of the robot on the ground and the feet connected to the plurality of legs, and to distribute the compensation moments calculated by the compensation moment calculation unit to the plurality of legs by allotting a larger value of the compensation moment to a leg closer to the projection point of the COG of the king robot on the ground using the calculated distance rates.

The target torque calculation unit calculates first target torques required by the plurality of legs of the robot from the compensation moments distributed to the plurality of legs by the compensation moment distribution unit using a Jacobian regarding the feet of the robot as bases.

The target torque calculation unit calculates second target torques required by the respective joints of the robot by adding the gravity compensation torques calculated by the gravity compensation torque calculation unit to the first target torques.

The robot further including a torque compensation unit to calculate third target torques by adding damping torques in proportion to angular velocities of the respective joints to the second target torques calculated by the target torque calculation unit.

In accordance with another aspect of the present disclosure, a method of controlling a robot provided with a plurality of legs each having a plurality of joint parts and an upper body connected to the legs while having a plurality of translation degrees of freedom and a rotation degree of freedom, the method includes detecting a pose angle of the upper body and angles of the plurality of joint parts; acquiring a current pose of the robot with respect to at least one of the plurality of translation degrees of freedom based on the detected angles of the plurality of joint parts; calculating a pose error by comparing the acquired current pose with a target pose that is set in advance; calculating a compensation force with respect to the at least one translation degree of freedom based on the pose error; setting virtual gravities based on the compensation force with respect to the at least one translation degree of freedom and a current state of a Finite State Machine (FSM) that is set with respect to the robot in advance; calculating gravity compensation torques required by the plurality of joint parts of the robot to compensate for the virtual gravities set; and controlling torque servos of the respective joint parts so that torque values of the respective joints of the robot reach target torques that include the calculated gravity compensation torques.

The calculating of the pose error includes: calculating a position of a current COG based on the detected pose angle and the angles of the plurality of joint parts, wherein a position of a current COG with respect to the at least one translation degree of freedom is calculated; calculating a COG error with respect to the at least one translation degree of freedom by comparing the calculated current COG with a target COG that is set in advance; and using the COG error as the pose error.

The calculating of the pose error includes detecting a position and velocity of a current COG based on the detected pose angle and the angles of the plurality of joint parts, wherein a position and velocity of a current COG with respect to the at least one translation degree of freedom is detected; acquiring a current capture point with respect to the at least one translation degree of freedom based on the detected position and velocity of the current COG; calculating a capture point error with respect to the at least one translation degree of freedom by comparing the obtained current capture point with a target capture point that is set in advance; and using the capture point error as the pose error.

The calculating of the pose error includes detecting the pose angle of the upper body and the angles of the plurality of joint parts; calculating a position of a reference point of one of a hip and the upper body with respect to the at least one translation degree of freedom based on the pose angle and the angles of the plurality of joint parts; calculating a position error of the reference point with respect to the at least one translation degree of freedom by comparing a position of a current reference point with a position of a target reference point set in advance; and using the position error of the reference point as the pose error of the at least one translation degree of freedom.

The calculating of the pose error is different from calculating a power error of the remaining translation degree of freedom among the plurality of translation degrees of freedom.

The setting of the virtual gravities required by the respective joint parts of the robot includes setting first virtual gravity required by the respective joints of the robot using Equation 2 below, if $g_f$ represents the first virtual gravity, m represents the mass of the robot and f represents the compensation force calculated; and setting second virtual gravity required by the respective joints according to the current state of the FSM of the robot, $$g_f = f/m \qquad [\text{Equation 2}]$$

The calculating of the gravity compensation torque includes calculating a gravity compensation torque to the first virtual gravity and a gravity compensation torque to the second virtual gravity; and adjusting rates of the gravity compensation torque to the first virtual gravity and the gravity compensation torque to the second virtual gravity according to the current state of the FSM of the robot, thereby calculating gravity compensation torques of the respective joints that are to be provided to the joint parts of the robot.

The method further includes setting a target pose angle to maintain a stable pose of the robot; and calculating compensation moments to compensate for a difference between the target pose angle and the measured pose angle.

The method further includes calculating first target torques required to supply the calculated compensation moments to the respective joints of the robot; and calculating second target torques by adding the gravity compensation torques to the first target torques, wherein the target torque is the second target torque.

The method further includes calculating third target torques by adding damping torques in proportion to angular velocities of the respective joints to the second target torques calculated, wherein the target torque is the third target torque.

The method further includes calculating distance rates between a projection point of the COG of the robot on the ground and a plurality of feet of the robot, and distributing the calculated compensation moments to the plurality of legs by allotting a larger value of the compensation moment to a leg closer to the projection point of the COG of the robot on the ground using the calculated distance rates.

The calculating of the first target torques includes calculating the first target torques required by the plurality of legs of the robot from the compensation moments distributed to the plurality of legs using a Jacobian regarding the feet of the robot as bases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
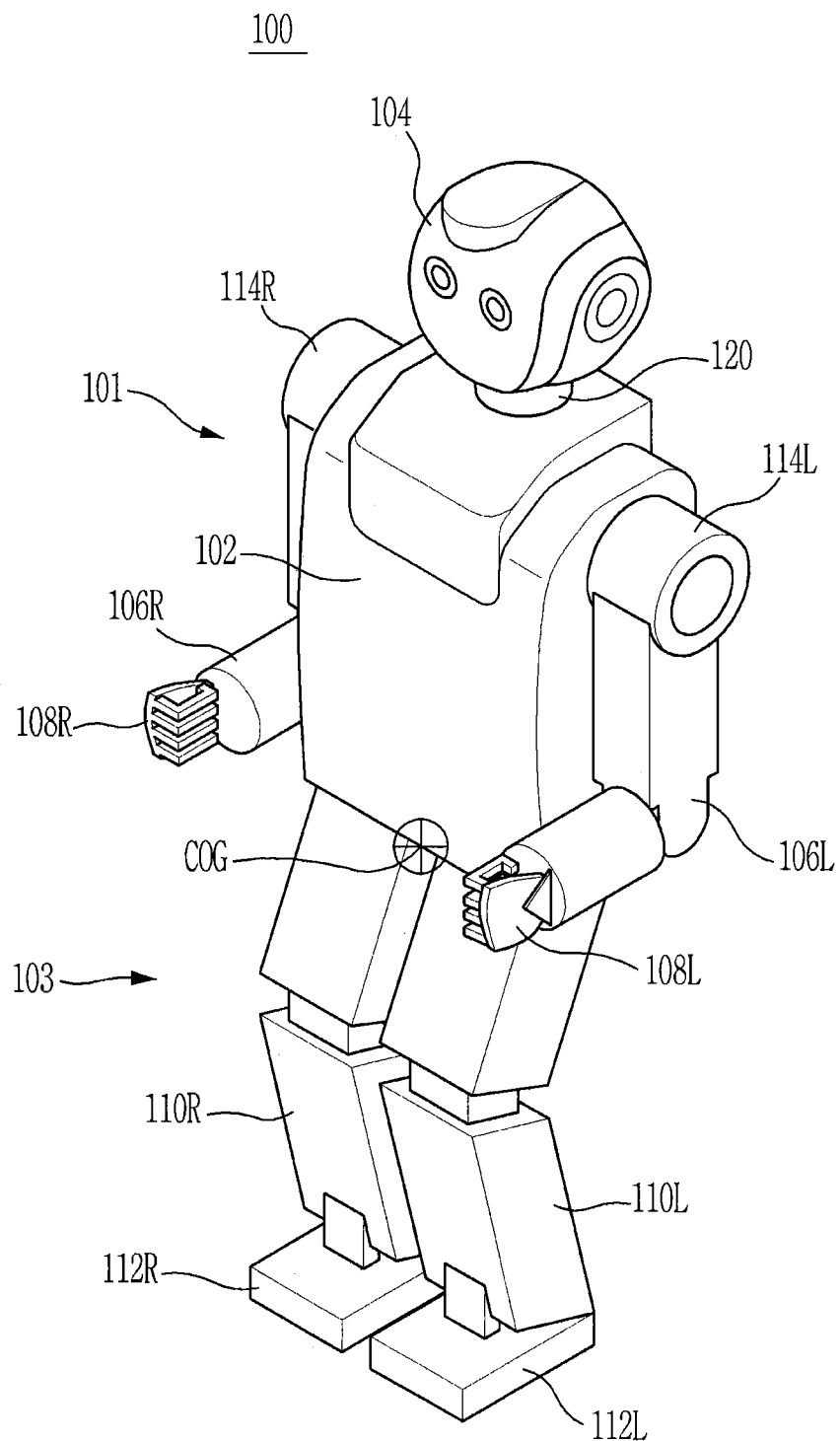
FIG. 1 is a view illustrating the external appearance of a robot in accordance with an embodiment of the present disclosure.

Reference will now be made in detail to the embodiments of the present disclosure, examples of which are illustrated in the accompanying drawings, wherein like reference numerals refer to like elements throughout.

Figure 2:
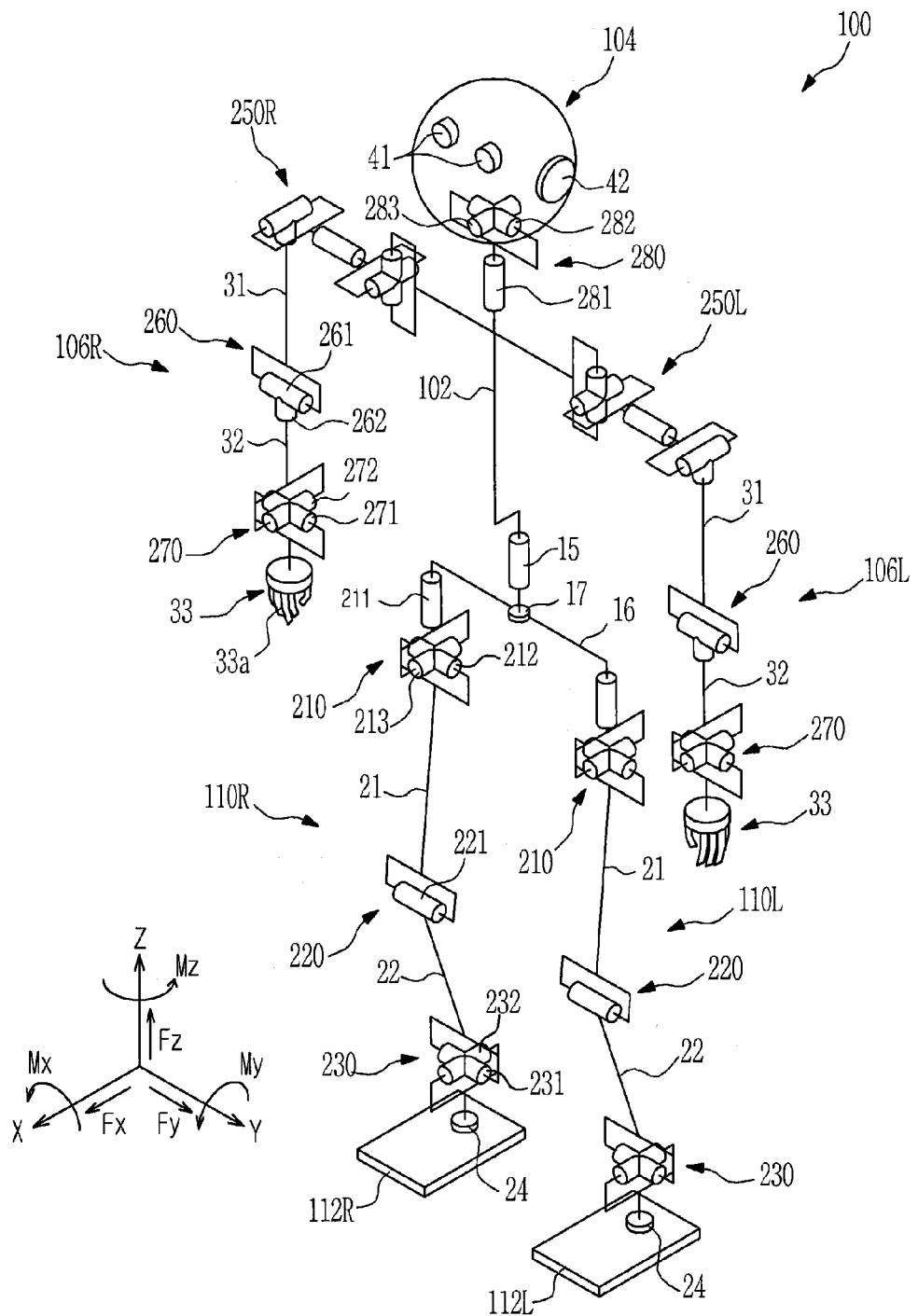
FIG. 2 is a view illustrating main joint structures of the robot in accordance with an embodiment of the present disclosure.

FIG. 1 is a view illustrating the external appearance of a robot in accordance with an embodiment of the present disclosure. FIG. 2 is a view illustrating main joint structures of the robot in accordance with an embodiment of the present disclosure.

As shown in FIGS. 1 and 2, a robot 100 in accordance with this embodiment of the present disclosure is a bipedal robot, which walks erect with two legs 110R and 110L in the same manner as a human, and includes an upper body 101 including a torso 102, a head 104 and arms 106R and 106L, and a lower body 103 including the two legs 110R and 110L.

The upper body 101 of the robot 100 includes the torso 102, the head 104 connected to the upper portion of the torso 102 through a neck 120, the two arms 106R and 106L connected to both sides of the upper portion of the torso 102 through shoulders 114R and 114L, and hands 108R and 108L respectively connected to tips of the two arms 106R and 106L.

A waist joint part 15 (refer to FIG. 2) having 1 degree of freedom in the yaw direction so as to rotate the upper body 101 is installed on the torso 102 of the robot 100.

The lower body 103 of the robot 100 includes a pelvis link 16 connected to the lower portion of the waist joint part 15, the two legs 110R and 110L connected to both sides of the lower portion of the pelvis link 16, and feet 112R and 112L respectively connected to tips of the two legs 110R and 110L.

Each of the head 104, the arms 106R and 106L, the hands 108R and 108L, the legs 110L and 110R and the feet 112L and 112R has a predetermined level of a translation degree of freedom and a rotation degree of freedom through each joint.

Here, "R" and "L" respectively indicate the right and left sides of the robot 100, and "COG" indicates the center of gravity of the robot 100.

Further, cameras 41 to capture surrounding images and microphones 42 for user voice input may be installed on the head 104 of the robot 100.

The head 104 is connected to the torso 102 of the upper body 101 through a neck joint part 280. The neck joint part 280 includes a rotary joint 281 in the yaw direction (rotated about the Z-axis), a rotary joint 282 in the pitch direction (rotated about the Y-axis), and a rotary joint 283 in the roll direction (rotated about the X-axis), and thus has 3 degrees of freedom.

Motors (for example, actuators, such as electric motors or hydraulic motors) to rotate the head 104 are connected to the respective rotary joints 281, 282, and 283 of the neck joint part 280.

The two arms 106R and 106L of the robot 100 respectively include upper arm links 31, lower arm links 32, and hands 33.

The upper arm links 31 are connected to the upper body 101 through shoulder joint parts 250R and 250L, the upper arm links 31 and the lower arm links 32 are connected to each other through elbow joint parts 260, and the lower arm links 32 and the hands 33 are connected to each other by wrist joint parts 270.

The shoulder joint parts 250R and 250L are installed at both sides of the torso 102 of the upper body 101, and connect the two arms 106R and 106L to the torso 102 of the upper body 101.

Each elbow joint part 260 has a rotary joint 261 in the pitch direction and a rotary joint 262 in the yaw direction, and thus has 2 degrees of freedom.

Each wrist joint part 270 has a rotary joint 271 in the pitch direction and a rotary joint 272 in the roll direction, and thus has 2 degrees of freedom.

Each hand 33 is provided with five fingers 33a. A plurality of joints (not shown) driven by motors may be installed on the respective fingers 33a. The fingers 33a perform various motions, such as gripping of an article or pointing in a specific direction, in connection with movement of the arms 106.

Further, the pelvis link 16 having two hip joint parts 210 is connected to the lower portion of the torso 102. The pelvis link 16 corresponds to the pelvis of a human and is connected to the torso 102 of the upper body 101 through the hip joint parts 210.

The two legs 110R and 110L of the robot 100 respectively include thigh links 21, calf links 22, and the feet 112R and 112L.

The thigh links 21 correspond to the thighs of a human and are connected to the pelvis link 16 through the hip joint parts 210, the thigh links 21 and the calf links 22 are connected to each other by knee joint parts 220, and the calf links 22 and the feet 112R and 112L are connected to each other by ankle joint parts 230.

Each hip joint part 210 has a rotary joint (hip yaw joint) 211 in the yaw direction (rotated about the Z-axis), a rotary joint (hip pitch joint) 212 in the pitch direction (rotated about the Y-axis), and a rotary joint (hip roll joint) 213 in the roll direction (rotated about the X-axis), and thus has 3 degrees of freedom.

Each knee joint part 220 has a rotary joint 221 in the pitch direction, and thus has 1 degree of freedom.

Each ankle joint part 230 has a rotary joint 231 in the pitch direction and a rotary joint 232 in the roll direction, and thus has 2 degrees of freedom.

Since six rotary joints of the hip joint part 210, the knee joint part 220, and the ankle joint part 230 are provided on each of the two legs 110R and 110L, a total of twelve rotary joints is provided to the two legs 110R and 110L. Therefore, the robot 100 in accordance with the embodiment of the present disclosure includes of a pair of legs, each of which has 6 degrees of freedom.

Although not shown in the drawings, actuators, such as motors, to drive the respective rotary joints are installed on the robot 100, and the robot 100 may perform various motions by properly controlling the actuators. Although kinds of the actuators are not limited, the embodiment of the present disclosure will exemplarily describe servo motors as the actuators.

In order to execute a control action, the robot 100 calculates torque commands of the respective joints in response to the control action, and outputs the calculated torque commands to torque servos to drive the servo motors.

The walking motion of the robot 100 in accordance with the embodiment of the present disclosure will be described in detail based on the above-described information.

Figure 3:
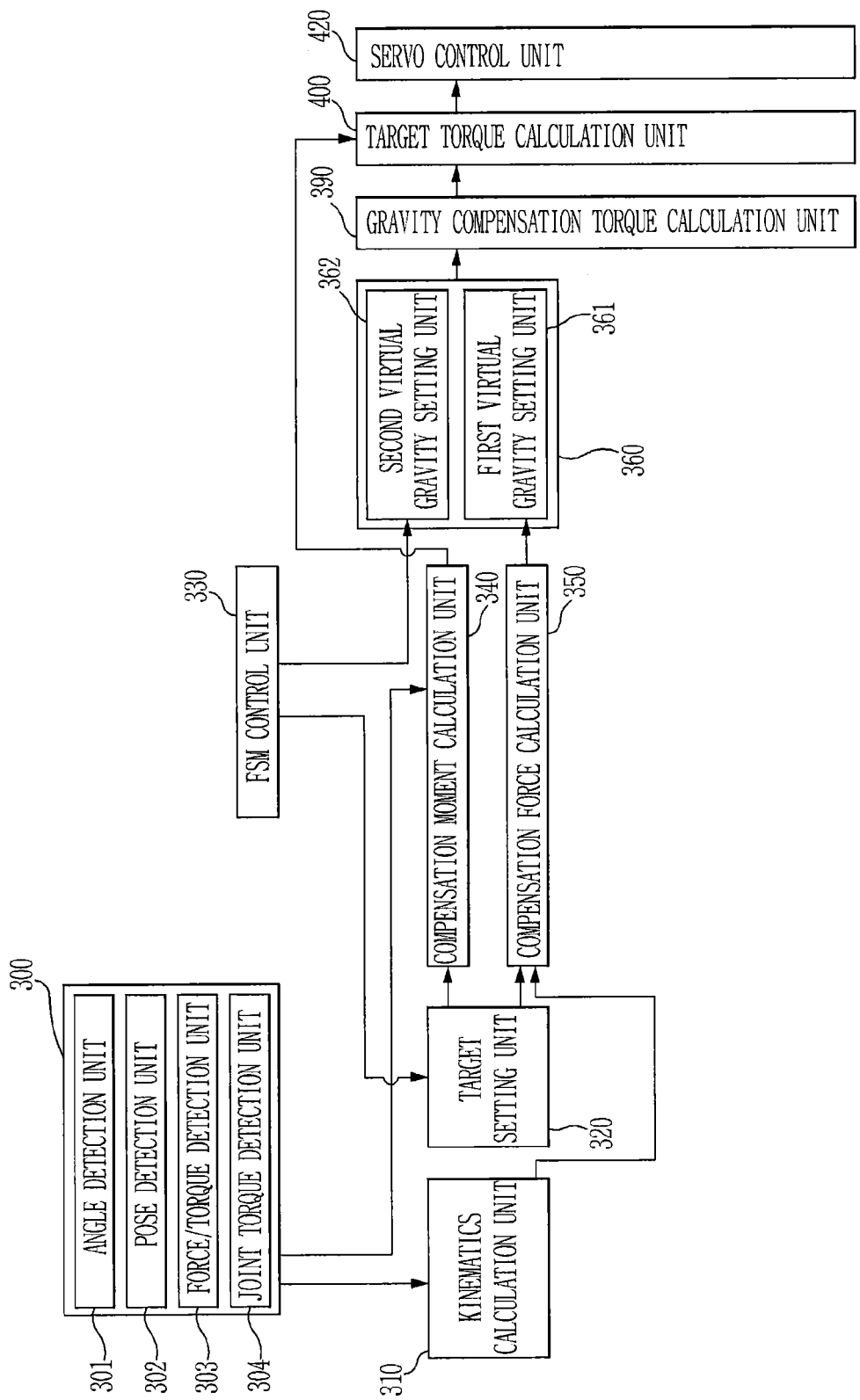
FIG. 3 is a control block diagram of the robot in accordance with an embodiment of the present disclosure.

FIG. 3 is a control block diagram of the robot 100 in accordance with the embodiment of the present disclosure.

With reference to FIG. 3, the robot 100 in accordance with the embodiment of the present disclosure is controlled by a sensor unit 300 to measure the state of the robot 100, an FSM control unit 330 to store a finite state machine (FSM) of the robot 100 in advance and to control the state of the FSM of the robot 100, a kinematics calculation unit 310 to acquire a current pose the robot 100 using the state of the robot 100 measured by the sensor unit 300, a target setting unit 320 to set a target pose of the robot 100, a compensation force calculation unit 350 to calculate compensation forces required to balance the robot 100 using a difference between the set target pose and the acquired current pose, a compensation moment calculation unit 340 to calculate compensation moments required to balance the robot 100 using the information measured by the sensor unit 300, a virtual gravity setting unit 360 to set the sizes of virtual gravities required by the respective joints of the robot 100 using the current state of the predetermined FSM of the robot 100 and the sizes of the compensation forces calculated by the compensation force calculation unit 350, a gravity compensation torque calculation unit 390 to calculate gravity compensation torques to the virtual gravities set by the virtual gravity setting unit 360 and actual gravity, a target torque calculation unit 400 to calculate target torques required by the respective joints of the robot 100 by summing the gravity compensation torques calculated by the gravity compensation torque calculation unit 390 and the joint torques to the compensation moments calculated by the compensation moment calculation unit 340, and a servo control unit 420 to control the torque servos of the respective joints so that the torque values of the respective joints of the robot 100 reach the target torque values calculated by the target torque calculation unit 400.

The sensor unit 300 may include an angle detection unit 301 to detect angles of the respective joint parts of the robot 100, a pose detection unit 302 to detect a pose angle of the robot 100, a force/torque detection unit 303 to detect a contact between the feet 112 and the ground or detect a load applied to the feet 112, and a joint torque detection unit 304 to measure torques of the respective joints of the robot 100.

The angle detection unit 301 is configured to angles of the respective joint parts forming the robot. The angle detection unit 301 detects a rotation angle of a motor which is provided at each axis of the joint parts. Herein, the angle of the joint part may be detected by use of rotational frequencies of the motor (not shown), and the rotation frequencies may be detected through a joint encoder that is connected to each motor.

The pose detection unit 302 is implemented using an Inertial Measurement Unit (IMU) 17. The IMU 17 detects a relative angle of the pelvis link 16 (refer to FIG. 2) with respect to the direction of gravity and the inertial frame, and generates pose information in the roll direction (rotated about the X-axis), pose information in the pitch direction (rotated about the Y-axis) and pose information in the yaw direction (rotated about the Z-axis). In detail, the IMU 17 detects at least one of a rotation angle in the roll direction (rotated about the X-axis), a rotation angle in the pitch direction (rotated about the Y-axis) and a rotation angle in the yaw direction (rotated about the Z-axis). Hereinafter, the angle detected by the pose detection unit 302 will be referred to as a pose angle. However, the detecting of the pose angle is not limited to the pelvis link 16. According to another embodiment of the preset disclosure, pose angles for other links, such as the head or the torso, may be detected. In addition, the measurement of the pose of the robot 100 may be implemented using Tilting Detection and Gyro Sensor as well as the IMU, and thus, the present disclosure is not limited thereto.

The force/torque detection unit 303 may be implemented using multi-axis F/T sensors that are respectively installed between the feet 112R and 112L and the ankle joint parts 230 of the two legs 110R and 110L. The multi-axis F/T sensors 24 (refer to FIG. 2) measure three-directional components Fx, Fy, and Fz of force and three-directional components Mx, My, and Mz of moment transmitted from the feet 112R and 112L, thereby detecting whether or not the feet 112R and 112L touch the ground, or whether or not loads are applied to the feet 112R and 112L. As sensors to detect whether or not the feet 112R and 112L touch the ground, in addition to the F/T sensors, contact sensors or other sensors may be used.

The kinematics calculation unit 310 calculates a current pose of the robot 100 using the state information of the robot 100 measured by the sensor unit 300. The pose of the robot 100 may include the position and the angle of the robot 100, and may be acquired by use of the position and velocity of the COG and a capture point.

In general, the pose of the robot is represented using angles of all joints of the upper body and the lower body of the robot 100. However, the pose of the robot according to the present disclosure is represented as follows. The pose of the robot is represented using the position and the angle of the robot with respect to a translation degree of freedom and a rotation degree of freedom of the robot in a working space.

The position and the angle of the robot are represented using a position and an angle of a certain point of the robot. The position of the robot is represented in a three dimensional coordinates of a certain point of the robot in the X, Y and Z axes on a reference coordinating system by use of forward kinematics, with respect to three axes translation degrees of freedom.

In addition, the angle of the robot is represented using a forward kinematics, with respect to a rotation degree of freedom or using a pose angle that is detected through the pose detection unit 302. According to the present disclosure, the angle of a joint for having a certain pose is not designated.

For the position and the angle forming a pose of the robot, a point representing the position may be a COG of the robot or a capture point. Alternatively, the position of the robot may be represented by using a point fixed to a portion of the body, except for the legs or arms, as a reference point.

A capture point, by definition, is a point on a horizontal surface (that is, the ground). However, the capture point according to the present disclosure may be regarded as a point existing in a three dimensional space. A capture point in a three dimensional space may be referred to as a point that is moved from the COG in a moving direction of the COG by a distance in proportion to the velocity of the COG.

A point representing the position of the robot with respect to three dimensional translation degrees of freedom does not need to coincide with one of the COG, the capture point and the reference point, and may be implemented using various processes. For example, the position of the robot with respect to a horizontal direction translation degree of freedom (two-dimensional space) may be defined as a horizontal component (two-dimensional space) of the capture point. The position of the robot with respect to a vertical direction translation degree of freedom (one-dimension space) may be defined as a hip height.

The kinematics calculation unit 310 may read instantaneous values of the joint encoders of the respective joints, and calculate the position of the COG, a hip height, and the positions and directions of the two feet of the robot 100, with respect to a robot base coordinate system using the predetermined sizes and weights of the joint links. The position of the current COG of the robot 100 is located in the torso 102, and the direction of the current COG of the robot 100 follows the orientation of the inertial system fixed in the direction of gravity.

The kinematics calculation unit 310 may calculate a transformation matrix between the base coordinate system and a global (or world) coordinate system, and transform the calculated position information, with respect to the base coordinate system into position information corresponding to the global coordinate system. As such, a relative moving trajectory of the COG of a foot contacting the ground is calculated, a velocity of the foot is calculated, and velocity and position of the COG and a hip height of the robot 100 are calculated.

The capture point in the three dimensional space may be obtained by using the COG of the robot and the velocity of the robot 100.

The capture point at the current position of the robot 100 is calculated by Equation 1 below.

$$CP = dCOG + w * vCOG \qquad \text{[Equation 1]}$$

CP represents the position of the capture point, dCOG represents the position of the COG, and vCOG represents the velocity of COG. w may be acquired by calculating $w = \sqrt{(h/g)}$. Here, h is a height of the COG from the ground, and g is the acceleration of gravity. The capture point in a two dimensional horizontal plane is obtained only by taking (x,y) components among (x,y,z) components of the three dimensional capture point that is calculated above.

That is, the kinematics calculation unit 310 calculates a COG based on angles of a plurality of joint parts of the robot 100, and acquires a current pose by regarding the COG as the position of the robot.

Alternatively, a position and a velocity of the COG are calculated based on angles of a plurality of joint parts. A current capture point is calculated based on the position and the velocity of the COG. Then, a current pose is acquired by regarding the current capture point as the position of the robot. Alternatively, a position of a reference point of a hip or an upper body is calculated based on a pose angle of the upper body or angles of a plurality of joint parts. Also, a current pose is acquired by regarding the reference point as the position of the robot. The target setting unit 320 sets a target pose according to the current state of the FSM.

The target pose of the robot is represented using a target capture point, a target pose angle, a target hip height, etc. The capture point may be expressed using various processes. The capture point may be expressed as a position of a point that is moved by a distance corresponding to the velocity of the COG, and of course, considering the velocity of the COG.

The target setting unit 320 may set a target capture point as a point on a line that extends in the direction of gravity inside an area that is supported by the both feet of the robot to prevent from falling down, and set the target capture point as a target pose with respect to a translation degree of freedom of the robot.

Although the target pose angle of the robot may be set randomly, the target pose angle may be set, such that the upper body of the robot 100 is parallel with the direction of gravity so as to allow the robot 100 to have an erect pose.

The FSM is a conceptual model representing a finite number of states which appear for a given time. The FSM of the robot may be set randomly by a designer, and the robot has a predetermined number of states which are circulated.

The FSM control unit 330 stores the FSM of the robot 100 in advance, and controls the FSM of the robot 10 by judging the current state of the FSM of the robot 100 and judging whether or not the current state of the FSM may transition to the next state of the FSM.

The compensation force calculation unit 350 calculates a position error by comparing the current position of the robot 100 with the target position of the robot 100 that is sent by the target setting unit 320. Further, and the compensation for calculation unit 350 calculates a compensation force to compensate for the position error, with respect to at least one degree of freedom based on the position error.

The compensation moment calculation unit 340 calculates compensation moments required to maintain the erect state of the robot 100, i.e., calculates compensation moments in the X, Y and Z directions using the difference between the current pose angle of the pelvis link 16, which is measured by the pose detection unit 302, and a target rotation angle, which is set by the target setting unit 320. In this case, the pose angle of the robot may be measured with respect to the trunk link or the head link other than the pelvis link 16.

The virtual gravity setting unit 360 sets the size of virtual gravity using the current state of the FSM of the robot 100 and the compensation force calculated by the compensation force calculation unit 350. The virtual gravity set using the compensation force is expressed by Equation 2 below.

$$g_f = f/m \quad \text{[Equation 2]}$$

Here, $g_f$ represents virtual gravity, f represents compensation force calculated by the compensation force calculation unit 350, and m represents the mass of the robot 100. Virtual gravity according to states of the FSM of the robot 100 will be described later.

The gravity compensation torque calculation unit 390 calculates gravity compensation torques required by the respective joints to compensate for the virtual gravity, which is set by the virtual gravity setting unit 360 and actual gravity. The gravity compensation torques may be calculated using the sum of virtual acceleration of gravity and actual acceleration of gravity, angles of the respective joints, weights of the respective links, and positions of the COGs in the respective links The target torque calculation unit 400 calculates the sum of torques to be transferred to the respective joints. Here, pose control, i.e., both moment compensation and gravity compensation, need to be considered. Therefore, the target torque calculation unit 400 calculates first target torques to generate the compensation moments that are calculated by the compensation moment calculation unit 340. Additionally, the target torque calculation unit 400 calculates second target torques by adding the gravity compensation torques to the first target torques. Here, a 6-by-6 Jacobian matrix may be used.

The servo control unit 420 receives the second target torques required by the respective joints from the target torque calculation unit 400, and controls the respective torque servos so that the torque values of the respective joints reach the second target torques.

Hereinafter, the motion of the robot 100, according to an embodiment of the present disclosure, will be described in detail, in which the position of the robot 100 of information representing the pose of the robot 100 includes a capture point and a hip height. That is, a horizontal direction translation degree of freedom (two-dimensional) is obtained based on a capture point, and a vertical direction translation degree of freedom is obtained by regarding a hip height as a reference point.

The robot 100 in accordance with the embodiment of the present disclosure is operated according to the FSM that is set in advance by a designer. A capture point serving as a target pose, which is set by the target setting unit 320, is differently set according to current states of the FSM of the robot 100. Hereinafter, the FSM of the robot 100 in accordance with the embodiment of the present disclosure will be described in detail.

Figure 4:
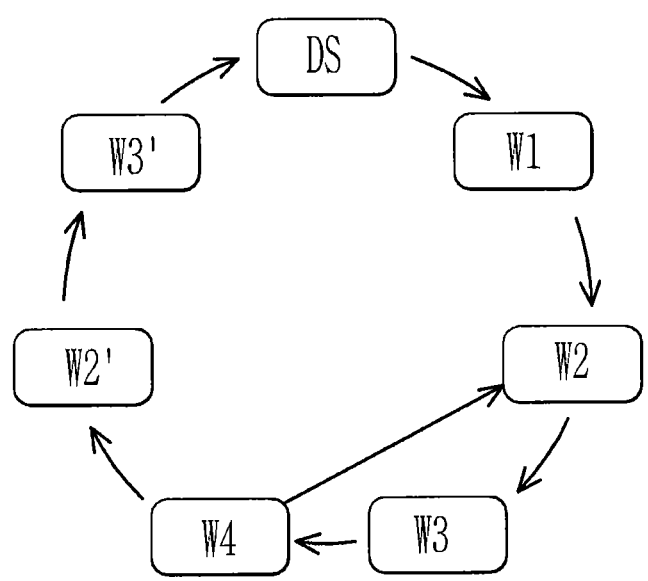
FIG. 4 is a diagram illustrating states of an Finite State Machine (FSM) of the robot in accordance with an embodiment of the present disclosure.

FIG. 4 is a diagram illustrating state transition of the FSM of the robot in accordance with the embodiment of the present disclosure. In this embodiment, the FSM includes 7 states, i.e., a state DS, a state W1, a state W2, a state W3, a state W4, a state W2', and a state W3', however, the present disclosure is not limited thereto. The state DS, the state W1, the state W2, the state W3, the state W4, the state W2, the state W3, the state W4, the state W2, and so on, are sequentially circulated. Further, when a stoppage command is inputted, stoppage standby states, i.e., the state W2' and the state W3', are executed after the state W4 and then transition to the state DS.

In the respective states of the FSM, target hip heights are equal, the X direction means the lengthwise direction of a support foot, forward in this direction representing positive values, and the Y direction means the counterclockwise direction by 90 degrees from the X direction, as seen from the top.

Further, the support foot means a foot which maintains the pose of the robot 100, i.e., a foot with which the robot 100 steps on the ground, and a swing foot means a foot which is lifted up to move.

Figure 5:
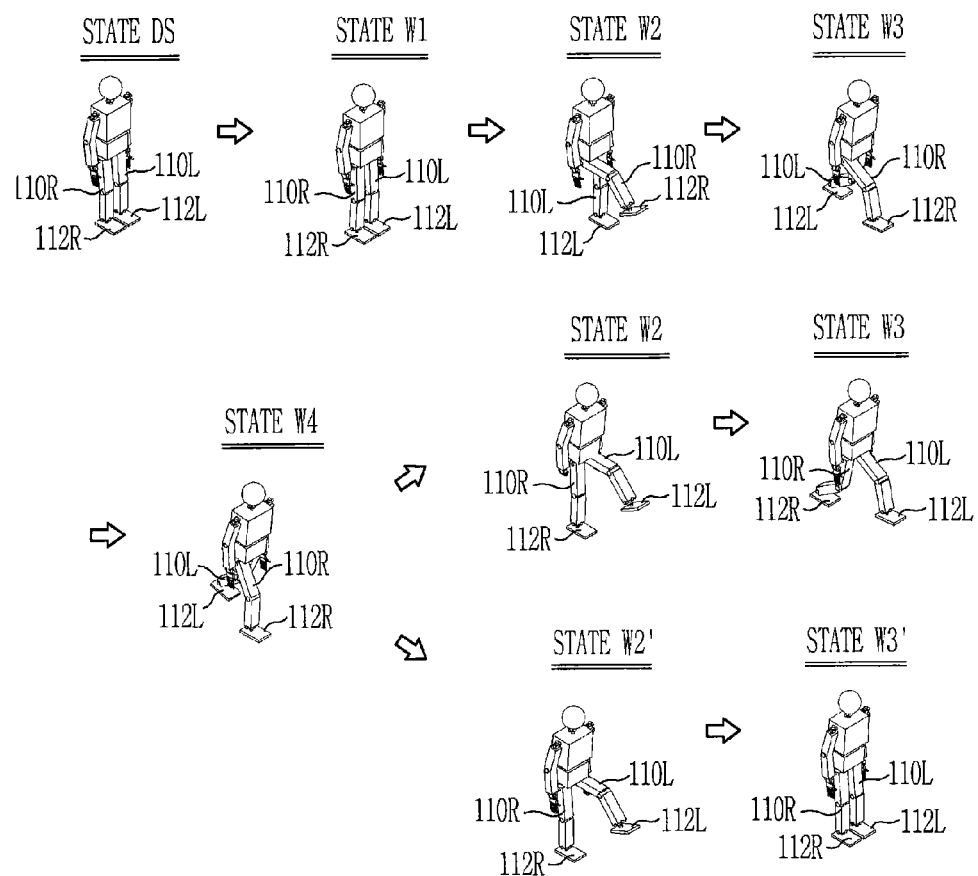
FIG. 5 is a view illustrating walking motions in the respective states of the FSM of the robot in accordance with an embodiment of the present disclosure.

FIG. 5 is a view illustrating walking motions of the robot 100 in the respective states of the FSM shown in FIG. 4. If walking of the robot 100 is started in the state DS, two legs of the robot 100 contact the ground in the state DS, and the external appearance of the robot 100 in the state W1 is the same as that of the robot 100 in the state DS but the robot 100 starts to move the COG to one leg, e.g., to the left leg 110L in this embodiment, in the state W1. The robot 100 is supported by the left leg 110L while lifting the right leg 110R up in the state W2, and the robot 100 moves the body in the progressing direction and lowers the right leg 110R so that the right foot 12R contacts the ground in the state W3. The robot 100 moves the COG to the left leg 110L after contact of the right foot 112R with the ground in the state W4, and when the state W4 transitions to the state W2, the legs 110R and 110L are exchanged, and then circulation of the state W2→state W3→state W4→state W2, and so on, is continued until the stoppage command is inputted. If the stoppage command is inputted, the state W4 transitions to the state W2'. The state W2' is similar to the state W2 in that the robot 100 lifts the left leg 110L up, but in the state W2', the robot 100 does not move forwards, and thus, the X component of the target capture point is located at the center of the support foot. Similarly, the state W3' is similar to the state W3 in that the left leg 110L contacts the ground, but in the state W3', the robot 100 does not move forwards, and thus, the left leg 110L contacts the ground at a position parallel with the right leg 110R.

With reference to FIGS. 4 and 5, the 7 states of the FSM transition in regular order, and one state transitions to the next state when a designated transition condition is satisfied. Motion contents and transition conditions of the respective states of the FSM may be randomly set by a designer, and the states of the FSM shown in FIGS. 4 and 5 will now be described in more detail.

First, in the state DS, the robot 100 is stopped under the condition that the two feet 112R and 112L of the robot 100 contact the ground. In this state, the target capture point is located at the center of the support polygon formed by the two feet 112R and 112L of the robot 100. When a walking command is inputted, the state DS transitions to the state W1.

In the state W1, the target capture point is moved to the support foot randomly selected from among the two feet 112R and 112L of the robot 100. When the actual capture point enters a stable region within the width of the support foot, the state W1 transitions to the state W2.

In the state W2, when the robot 100 lifts the swing foot up, the X component of the target capture point is set as a trajectory moving forwards from the center according to time, and the Y component of the target capture point is set to be located on the central line of the support foot. Lift-up of the swing foot is controlled by gravity compensation, and a detailed description thereof will be given later. In the state W2, when both the X component of the current capture point exceeds a threshold value and the height of the swing foot exceeds a threshold value, the state W2 transitions to the state W3.

In the state W3, the swing foot of the robot 100 is lowered to contact the ground while stretching the knee. In this state, the X component of the target capture point is set as a trajectory passing the front area of the support foot and increasing to a position where the swing foot is to make contact with the ground according to time. The Y component of the target capture point is set to move to the position where the swing foot is to make contact with the ground according to time. When the swing foot contacts the ground and the F/T sensor senses the Z component exceeding a threshold value, the state W3 transitions to the state W4.

In the state W4, the two feet 112R and 112L contact the ground, and the foot most recently contacting the ground serves as the support foot for the next state. In this state, the X and Y components of the target capture point are set as trajectories continuously moving from the position of the target capture point in the former state to the center of a new support foot within a short time. When the current capture point enters the support foot, if the stoppage command is not input, the state W4 transitions to the state W2, and if the stoppage command is input, the state W4 transitions to the state W2'.

In the state W2', the motion similar to that in the state W2, i.e., lift-up of the swing foot, is executed, but the robot 100 does not move forward and is stopped, and thus, the X component of the target capture point is fixed to the center of the support foot. When the height of the swing foot exceeds a threshold value, the state W2' transitions to the state W3'.

In the state W3', the motion similar to that in the state W3, i.e., lowering of the swing foot while stretching the knee to contact the ground, is executed, but the robot 100 does not move forwards and is stopped, and thus, the X component of the target capture point is not moved to the front area of the support foot and is set to be located within the support foot. Further, the Y component of the target capture point is set to be moved to the other foot. When the swing foot contacts the ground and the F/T sensor senses the Z component exceeding a threshold value, the state W3' transitions to the state DS.

Although this embodiment exemplarily illustrates the above-described states of the FSM, the motion contents and the number of states of the FSM may be varied as long as the states of the FSM are required to enable walking of the robot 100.

However, if the above-described states of the FSM are set, the robot 100 may naturally walk through a heel-to-toe motion similar to the walking style of a human, in which a heel touches on the ground first and then toes are dropped subsequently so that an effective length of the leg is lengthened and a stride is increased, as compared to a walking without a heel-to-toe motion. In addition, the robot 100 walks without bending knees, thus being capable of walking with a large stride as compared with a walking using inverse kinematics.

Hereinafter, control operation of the compensation force calculation unit 350 and the virtual gravity setting unit 360 will be described in detail based on the above-described states of the FSM.

Figure 6:
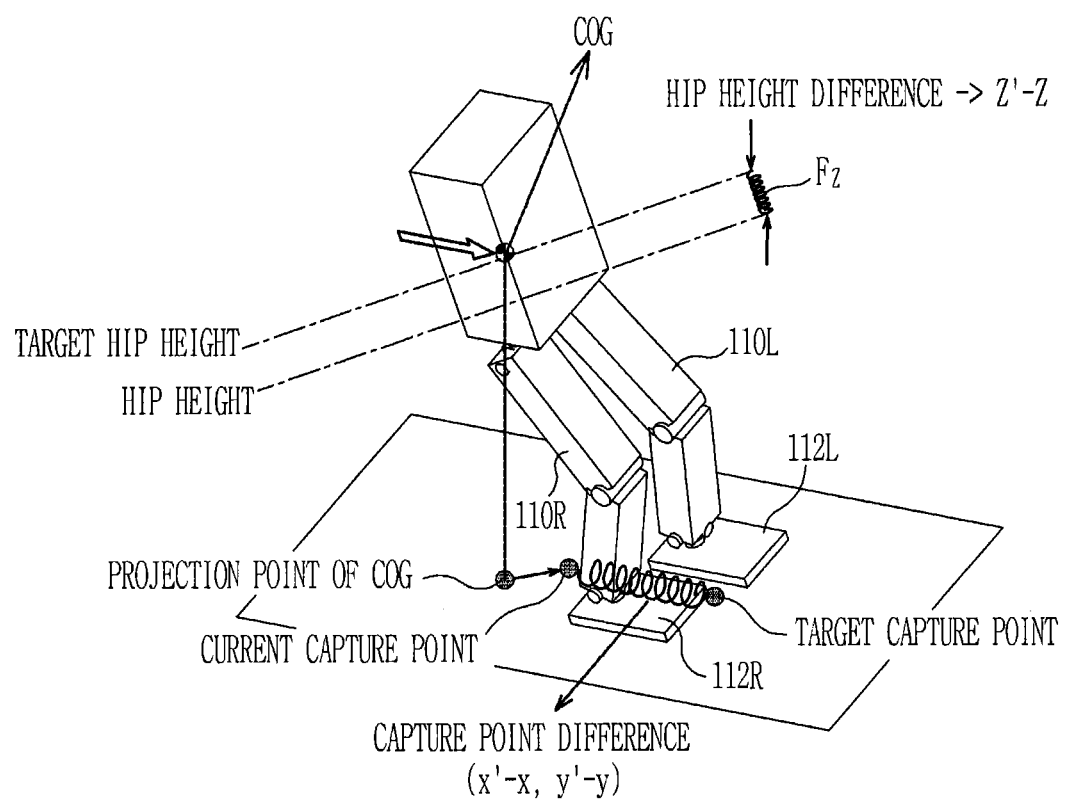
FIG. 6 is a view illustrating capture points of the robot in accordance with an embodiment of the present disclosure.

FIG. 6 illustrates the robot 100 in accordance with the embodiment of the present disclosure.

Referring to FIG. 6, the kinematics calculation unit 310 calculates the position and the velocity of the COG of the robot 100 using the state information of the robot 100, which is detected by the sensor unit 300. Further the kinematics calculation unit 310 also calculates the current capture point of the robot 100 using the position and the velocity of the calculated COG. In addition, the current hip height of the robot 100 is calculated based on the calculated COG.

The capture point, which is regarded as a point on the ground, represents the x, y components, and the hip height represents the z component.

The compensation force calculation unit 350 calculates compensation forces to be compensated for in the X and Y directions using the difference between the position of the target capture point and the position of the current capture point. Further, the compensation force calculation unit 350 also calculates compensation force to be compensated for in the Z direction using the difference between the target hip height and the current hip height.

Referring to FIG. 6, a virtual spring may be used in calculation of the compensation forces. On the assumption that the virtual spring having a spring constant k is present between the position of the target capture point and the position of the current capture point, the applied forces f1 and f2 may be expressed by Equation 3 below.

$$f1 = k*e1, f2 = k*e2 \qquad \text{[Equation 3]}$$

$e_1$ is coordinates representing the difference between the target capture point and the current capture point and is expressed as $e_1 = (x', y') - (x, y)$, and $f_1$ is expressed as $f_1 = (f_x, f_y)$. $(x', y')$ are position coordinates of the target capture point set by the target setting unit 320, and the position of the target capture point is varied according to the current state of the FSM of the robot 100, as described above. $(x, y)$ are position coordinates of the current capture point calculated by the kinematics calculation unit 310.

$e_2$ represents the difference between the target hip height set by the target setting unit 320 and the current hip height calculated by the kinematics calculation unit 310, and $f_2$ is expressed as $f_2 = f_z$. Accordingly, the compensation forces in the X direction, Y direction, and Z direction are calculated.

Since the target capture points set by the target setting unit 320 and the current capture points calculated by the kinematics calculation unit 310 are different in the respective states of the FSM, the compensation force calculation unit 350 calculates compensation forces according to the current state of the FSM of the robot 100.

The virtual gravity setting unit 360 sets virtual gravity required according to the state of the FSM of the robot 100 and virtual gravity to the compensation forces calculated by the compensation force calculation unit 350. In more detail, a first virtual gravity setting unit 361 sets support gravity to the compensation forces calculated by the compensation force calculation unit 350, i.e., first virtual gravity required to control the position of the capture point, and a second virtual gravity setting unit 362 sets lift gravity according to the state of the FSM of the robot 100, i.e., second virtual gravity.

Prior to the description of the setting of the virtual gravities, the support gravity is the virtual gravity required if the foot of the robot 100 supports the body of the robot 100 on the ground and the pose of the robot 100 is controlled, and the lift gravity is the virtual gravity required if the foot of the robot 100 swings in the air to be lifted up from the hip or to be lowered.

The first virtual gravity setting unit 361 sets virtual gravity to compensation forces by using Equation 2 shown above. Here, the virtual gravity corresponds to the support gravity.

Setting of the virtual gravity according to the state of the FSM by the second virtual gravity setting unit 362 will be described based on the above-described 7 states of the FSM.

If the FSM of the robot 100 is in the state W2, a control to lift the swing foot up is required, and thus, the rate of support gravity momentarily becomes 0 and the rate of the lift gravity momentarily becomes 1. Here, the Z component of the lift gravity is set to allow a height difference between the support foot and the swing foot to maintain a target value, and the X component of the lift gravity is biased to execute the swing of the swing foot in the forward moving direction. The Y component of the compensation force calculated by the compensation force calculation unit 350 is applied to the Y component of the lift gravity so that the robot 100 may balance right and left. Further, feedback due to an interval between the two legs 110R and 110L is applied to the Y component of the lift gravity so as to prevent collision between the two legs 110R and 110L.

If the FSM of the robot is in the state W3, the lift gravity is set so as to execute a motion of lowering the swing foot to contact the ground while stretching the knee of the swing leg. Here, the rate of the support gravity becomes 0 and the rate of the lift gravity becomes 1. The Z component of the lift gravity has a negative value so that the swing foot is lowered toward the ground. The Y component of the lift gravity provides feedback of a difference between the position of the current swing foot and the position of the capture point so that the swing foot proceeds to the capture point while maintaining the minimum interval between the right and left feet 112R and 112L. The X component of the lift gravity is determined as a difference with the target position of the swing foot, and the X component of the target position of the swing foot is increased in the positive (+) direction to move the swing foot forwards and is set through feedback of a difference between the position of the current foot and a target stride in order to achieve the target stride.

If the FSM of the robot 100 is in the state W4, the virtual gravity is set to achieve a toe-off motion in which the toe of the swing foot finally contacts the ground when the swing foot is lifted up. The rate of support gravity of the ankle pitch is set to 1, and the Z component of the support gravity is increased in proportion to the leaning of the weight of the robot 100 to the support foot. Support gravity having rate of 1 is applied to the knee and hip of the swing leg to facilitate movement of the weight of the robot 100. In order to prepare for lift-up of the swing foot in the next state of the FSM, the rate of the support gravity is decreased and the rate of the lift gravity is increased according to leaning of the weight of the robot 100 to the support foot.

If the FSM of the robot 100 is in the state W2', feedback control is implemented to allow the X component of the lift gravity of the swing foot to be located at a position parallel with the support foot.

If the FSM of the robot 100 is in the state W3', feedback of the X and Y components of the lift gravity is carried out so that the swing foot is lowered to a position aside the support foot by a designated interval, and the Z component of the lift gravity is decreased according to time, thereby allowing the swing foot to contact the ground using the weight thereof.

The gravity compensation torque calculation unit 390 calculates gravity compensation torques to the virtual gravities set by the first virtual gravity setting unit 361 and the second virtual gravity setting unit 362 and to actual gravity. The gravity compensation torques are calculated by Equation 4 below.

$$t_0 = -g^T \lfloor Q\{m_1(^0R_1{}^1r_1 + {}^0p_1) + \\ m_2(^0R_2{}^2r_2 + {}^0p_2) + \ldots + m_6(^0R_6{}^6r_6 + {}^0p_6)\} \rfloor$$

$$t_1 = -g^T [^0R_1 Q\{m_2(^1R_2{}^2r_2 + {}^1p_2) + m_3(^1R_3{}^3r_3 + {}^1p_3) + \\ \ldots + m_6(^1R_6{}^6r_6 + {}^1p_6)\}]$$

$$\vdots$$

$$t_5 = -g^T [^0R_5 Q\{m_6(^5R_6{}^6r_6 + {}^5p_6)\}]$$

[Equation 4]

Here, t represents gravity compensation torque of each joint, g represents a gravity vector, Q represents a 3×3 matrix, i.e., a cross product calculation of a joint axis, m represents a mass of each link, r represents COG offset of each link, R represents a rotation matrix for relative coordinate transformation between joints, and p represents a relative position vector between the joints.

Gravity compensation is classified into two kinds according to relative position relations between a joint serving as a main and an objective link to be compensated for. If the objective link is located above the joint, compensation of support gravity is carried out, and if the objective link is located below the joint, compensation of lift gravity is carried out.

On the assumption that a subscript 0 in Equation 4 represents a base link, in the case of compensation of the support gravity, gravity compensation torque of the foot joint of the robot is referred to as $t_0$, and gravity compensation torque of the hip joint is referred to as $t_5$.

On the contrary to compensation of the support gravity, in the case of compensation of the lift gravity, gravity compensation torque of the hip joint of the robot is referred to as $t_0$, and gravity compensation torque of the foot joint is referred to as $t_5$.

In gravity compensation applied to one joint, there are two components corresponding to support gravity and lift gravity, and the rates of the support gravity and the lift gravity are adjusted, according to the state of the FSM of the robot 100. That is, gravity compensation torque required for a specific joint of the robot 100 is expressed by Equation 5 below.

$$t = a*(\text{compensation of support gravity}) + b*(\text{compensation of lift gravity})$$ [Equation 5]

Here, t represents gravity compensation torque of the specific joint, a and b are actual numbers having values in the range of 0 to 1, and the gravity compensation torque of each joint according to the state of the FSM of the robot 100 is calculated by adjusting the values of a and b.

When gravity compensation torques of the two legs 110R and 110L of the robot 100 are calculated, the weight of the upper body of the robot 100 may be distributed to the two legs 110R and 110L. Therefore, the robot 100 in accordance with the embodiment of the present disclosure may further include a weight distribution unit 380.

Figure 7:
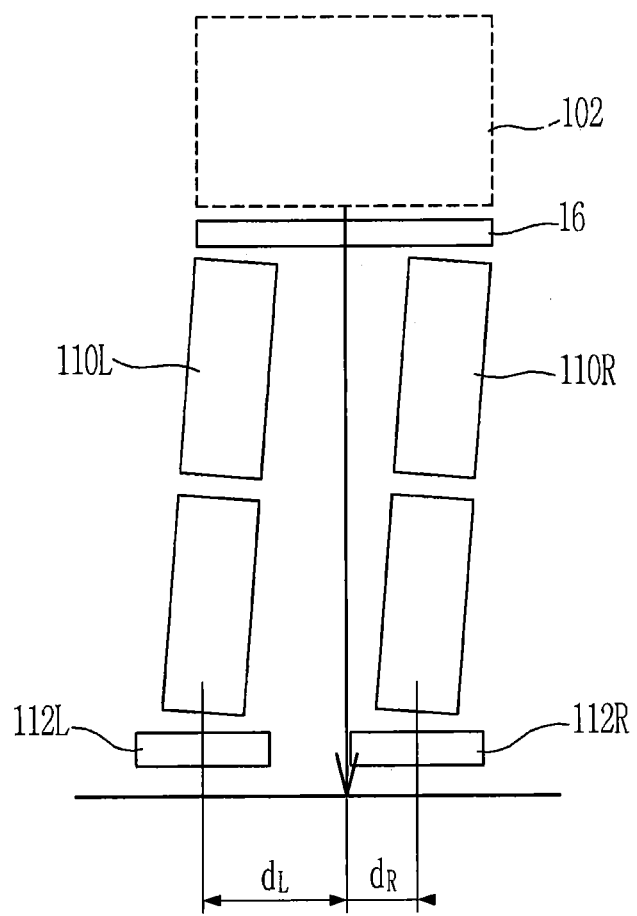
FIG. 7 is a view illustrating a lower body of the robot in accordance with an embodiment of the present disclosure.
Figure 8:
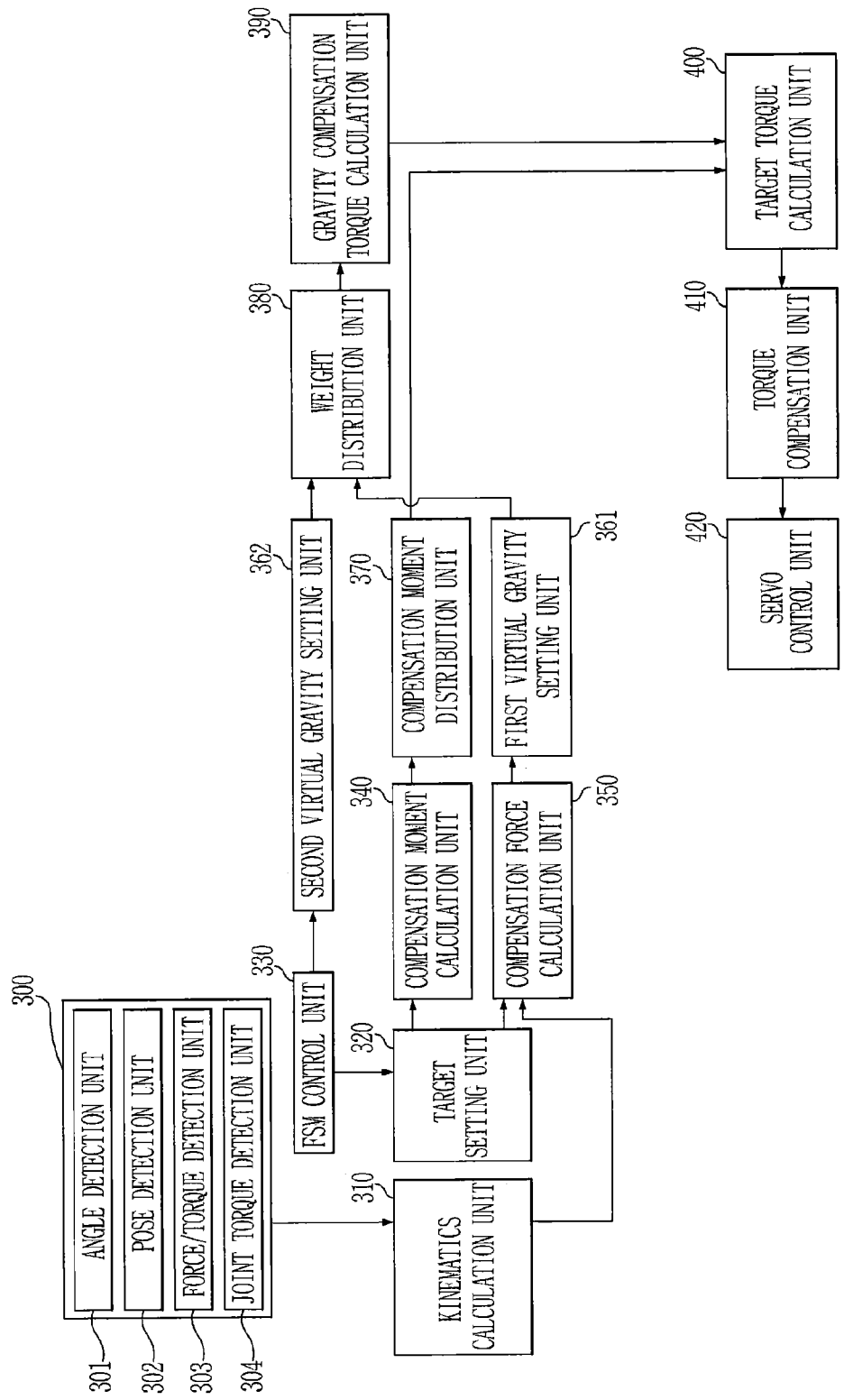
FIG. 8 is a control block diagram of the robot in accordance with an embodiment of the present disclosure.

FIG. 7 illustrates the robot tilted to one side, and FIG. 8 illustrates a control block diagram of a robot further including a weight distribution unit 380 and a torque compensation unit 410.

A method of calculating gravity compensations torques of the ankle, knee and hip joints in consideration of the weight of the links located above the two feet 112R and 112L of the robot 100 on the assumption that the two feet 112R and 112L serve as bases is the same as the method used in related robot control, but in the embodiment of the present disclosure, the weight of the pelvis 16 and the torso 102 located above the pelvis 16 needs to be distributed to the right and left legs 110R and 110L.

The weight distribution unit 380 allows the leg closer to the projection point of the COG of the robot 100 on the ground to support a greater portion of the weight of the pelvis 16 and the torso 102 using the projection point and distance rates $d_R$ and $d_L$ of the two feet 112R and 112L of the robot 100.

With reference to FIG. 7, the COG of the robot 100 inclined to the right side is tilted to the right side, and the projection point of the COG is closer to the right foot 112R. Therefore, a greater portion of the weight of the pelvis 16 and the torso 102 is distributed to the right leg 110R, and rates of the weight loaded on the right and left legs 110R and 110L are expressed by Equation 6 below.

$$W_L = d_R/(d_R+d_L)$$

$$W_R = 1 - W_L \qquad \text{[Equation 6]}$$

Here, $W_L$ is a rate of weight loaded on the left leg 110L, and $W_R$ is a rate of weight loaded on the right leg 110R. The weight distribution unit 380 applies a weight, calculated by multiplying the mass of the pelvis 16 and the torso 102 by $W_L$, to the left leg 110L and applies a weight, calculated by multiplying the mass of the pelvis 16 and the torso 102 by $W_R$, to the right leg 110R.

The compensation moment calculation unit 340 calculates compensation moments using differences between the rotation angles of the pelvis link 16 in the roll, pitch, and yaw directions measured by the pose detection unit 302 and the target rotation angles, as described above. Under the assumption that virtual springs are present on three axes in the roll, pitch, and yaw directions, compensation moments required by the respective joints may be calculated by Equation 7 below.

$$M = k_1 * e_3 \qquad \text{[Equation 7]}$$

$k_1$ represents a virtual spring constant, and $e_3$ represents a difference between a rotation angle measured by the pose detection unit 302 and a target rotation angle.

The target torque calculation unit 400 calculates torques required by the respective joints of the robot 100 using both the compensation moments calculated by the compensation moment calculation unit 340 and the gravity compensation torques calculated by the gravity compensation torque calculation unit 390.

Prior to calculation of the joint torques to the compensation moments, the calculated compensation moments may be distributed to the right and left legs 110R and 110L of the robot 100. Referring to FIG. 8, the robot 100 in accordance with the embodiment of the present disclosure may further include a compensation moment distribution unit 370.

The compensation moment distribution unit 370 distributes the compensation moments to the right and left legs 110R and 110L using the projection point of the COG of the robot 100 on the ground and the distance rates of the two feet 112R and 112L of the robot 100, in the same manner as the weight distribution unit 380. Compensation moment $M_R$ distributed to the right leg 110R may be obtained by multiplying the compensation moment calculated by the compensation moment calculation unit 340 by $W_R$ calculated by Equation 6 above, and compensation moment $M_L$ distributed to the left leg 110L may be obtained by multiplying the compensation moment calculated by the compensation moment calculation unit 340 by $W_L$ calculated by Equation 6 above. The compensation moment $M_L$ is obtained by Equation 8 below.

$$M_L = W_L * M, \; M_R = W_R * M, \qquad \text{[Equation 8]}$$

Herein, $W_L = d_R/(d_R+d_L)$, $W_R = 1-WL$, and dL, $d_R$ represent distances of both feet from the projection point of the COG.

The target torque calculation unit 400 calculates first target torques, which represent joint torques required to generate the respective compensation moments calculated by the compensation moment distribution unit 370 on the right and left legs 110R and 110L of the robot 100, by Equation 9 below.

$$\tau_{Left} = J^T \begin{bmatrix} 0 \\ M_{Left} \end{bmatrix} \qquad \text{[Equation 9]}$$

$$\tau_{Right} = J^T \begin{bmatrix} 0 \\ M_{Right} \end{bmatrix}$$

Herein, $J^T$ represents a Jacobian matrix with respect to the position of the COG of the robot 100 from the left side leg 110L and the right side leg 110R, and is used to convert the moment on Cartesian Space to joint torques. When assumed that the both feet of the robot 100 are regarded as bases, and the COG of the robot 100 is regarded as an end-effector existing on the pelvis link 16, a 6×6 Jacobian matrix J is calculated.

The target torque calculation unit 400 calculates second target torques by adding the gravity compensation torque calculated by the gravity compensation torque calculation unit 390 to the first target torque calculated through Equation 9 ($t_{2,L}$, $t_{2,R}$). For convenience sake, two of second target torques are represented. However, the second target torques are calculated for the respective joints (twelve joints in total) of the left and right side legs.

If a damping torque resisting in proportion to the velocity of each joint are added, a further stable walking motion is implemented. Referring to FIG. 8, the robot 100 according to the embodiment of the present disclosure may further include a torque compensation unit 410.

The torque compensation unit 410 calculates third target torques by adding damping torques of the respective joints to the second target torques calculated by the target torque calculation unit 400. The third target torque is obtained through Equation 10 below.

$$t_{3,L} = t_{2,L} + d*w \;\; t_{3,R} = t_{2,R} + d*w \qquad \text{[Equation 10]}$$

Here, $t_{3,R}$ and $t_{3,L}$ represent third target torques of the right and left legs 110R and 110L, d represents a damping coefficient, and w represents an angular velocity of a joint. Although two third target torques $\tau_{3,R}$ and $\tau_{3,L}$ are represented for convenience, third target torques of the respective joints of the right and left legs 110R and 110L (total 12 joints) are calculated in the same manner as the second target torques.

The servo control unit 420 receives the third target torques, i.e., final target torques, from the torque compensation unit, and controls the torque servos so that the servo motors of the respective joints of the robot 100 generate the third target torques. The torque servos of the respective joints may receive current output torque values of the respective joints from the joint torque detection unit 304 and transmit torque control signals to additionally generate torques corresponding to differences between the third target torques and the current torque values to driving circuits of the respective joints.

Functions of the respective control blocks of the robot 100 in accordance with the embodiment of the present disclosure will be described in brief. The sensor unit 300 measures the pose angle (represented as angles in the roll, pitch, and yaw directions) of the robot 100 and the rotation angles and output torque values of the respective joints of the robot 100. The kinematics calculation unit 310 calculates the position and velocity of the COG, and a hip height using the state information of the robot 100 measured by the sensor unit 300, and calculates the position of the current capture point of the robot 100 by combining the calculated position and velocity of the COG.

The FSM control unit 330 stores a finite number of states representing motions of the robot 100, judges the current state of the FSM of the robot 100, determines whether or not a transition condition from the current state to the next state is satisfied, and transmits signals to the respective control blocks to execute transition to the next state if the transition condition is satisfied.

The target setting unit 320 sets a target capture point according to the current state of the FSM judged by the FSM control unit 330, and sets a target hip height of the robot 100 and a target pose angle of the pelvis link 16.

The compensation force calculation unit 350 calculates compensation forces using a difference between the target capture point and the current capture point and a difference between the target hip height and the current hip height. The compensation moment calculation unit 340 calculates compensation moments using differences between the target pose angle and the current pose angle of the pelvis link 16.

The first virtual gravity setting unit 361 sets first virtual gravity to the compensation forces calculated by the compensation force calculation unit 350, and the second virtual gravity setting unit 362 sets second virtual gravity according to the current state of the FSM of the robot 100 judged by the FSM control unit 330. The weight distribution unit 380 distributes the weight of the upper body of the robot 100 to the right and left legs 110R and 110L using the COG of the robot and the distance rates of the right and left legs 110R and 110L, and the gravity compensation torque calculation unit 390 calculates gravity compensation torques to compensate for the first virtual gravity and the second virtual gravity in consideration of the weight of the upper body distributed to the right and left legs 110R and 110L.

The compensation moment distribution unit 370 distributes the compensation moments calculated by the compensation moment calculation unit 340 to the right and left legs 110R and 110L of the robot 100 using the distance rates in the same manner as the weight distribution unit 380, and calculates first target torques to generate compensation moments at the respective joints of the right and left legs 110R and 110L in consideration of the compensation moments distributed to the right and left legs 110R and 110L. Further, the compensation moment distribution unit 370 calculates second target torques by adding the gravity compensation torques to the first target torques.

The torque compensation unit 410 calculates third target torques by adding damping torques to the second target torques, and the servo control unit 420 transmits control signals required to generate the third target torques at the respective joints to the respective torque servos.

Hereinafter, a control method of a robot in accordance with an embodiment of the present disclosure will be described in detail.

Figure 9:
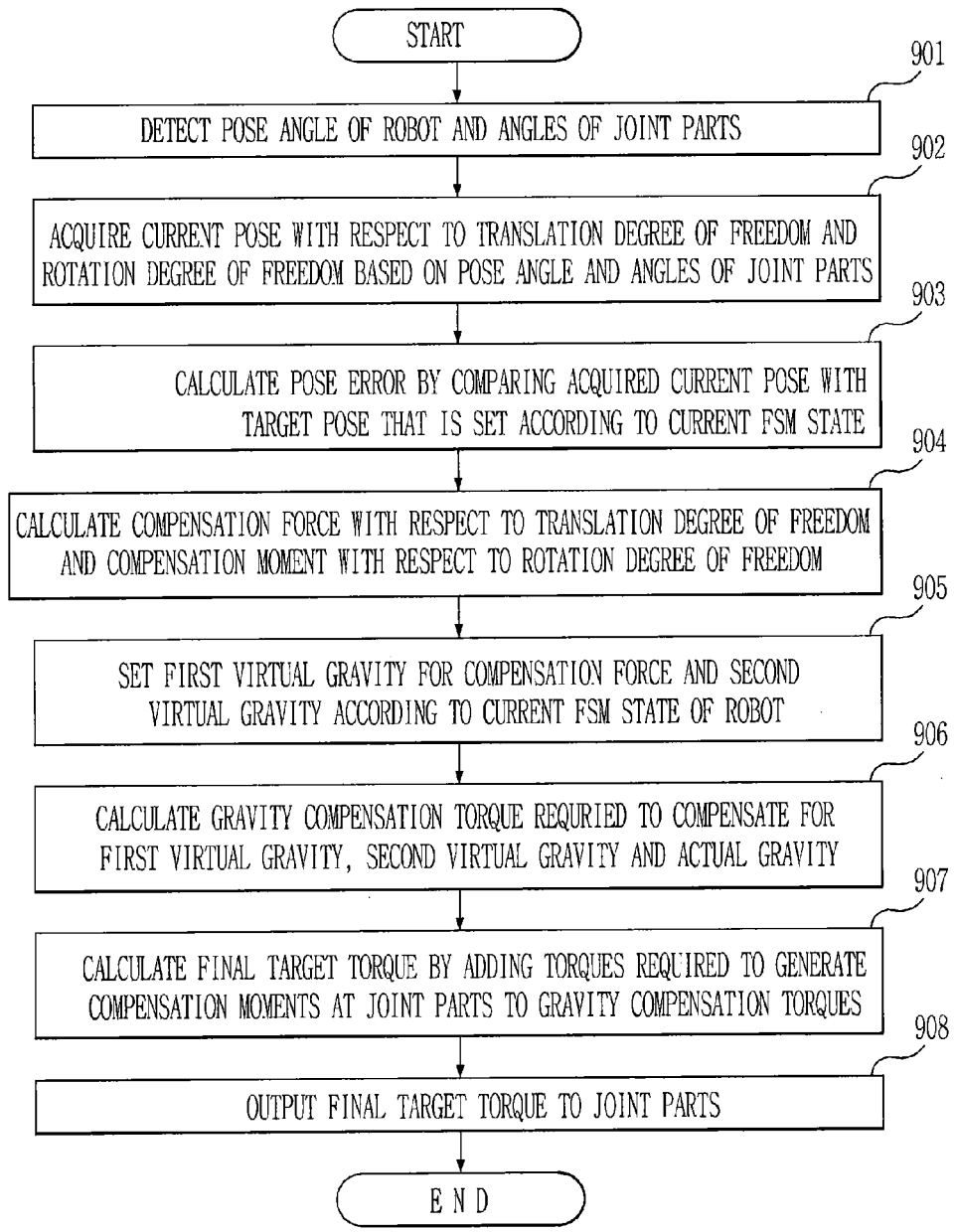
FIG. 9 is a flowchart illustrating a control method of a robot in accordance with an embodiment of the present disclosure.

FIG. 9 is a flowchart illustrating a control method of a robot in accordance with an embodiment of the present disclosure.

The pose angle of the upper body of the robot and the angles of a plurality of joint parts of the robot are detected (Operation 901). The current pose is acquired based on the pose angle and the angles of the plurality of joint parts (Operation 902). As described above, the current pose of the robot is represented using the current position of the robot with respect to the translation degree of freedom and the current pose angel of the robot with respect to the rotation degree of freedom.

Thereafter, a pose error is calculated by comparing a pose based on at least one translation degree of freedom among a plurality of translation degrees of freedom, a pose based on a rotation degree of freedom, and a pose set according to the current FSM state of the robot (Operation 903).

The position of the current COG with respect to at least one translation degree of freedom is detected based on the pose angle and the angles of the plurality of joint parts. A COG error is calculated by comparing the current COG detected with respect to at least one translation degree of freedom with the target COG that is set in advance. That is, a COG error with respect to at least one degree of freedom is calculated.

Herein, the COG error is used as a pose error with respect to at least one degree of freedom.

In addition, the position and the velocity of the current COG with respect to at least one degree of freedom are detected based on the pose angle and the angles of the plurality of joint parts. A current capture point with respect to at least one degree of freedom is acquired based on the position and the velocity of the current COG. A capture point error with respect to at least one degree of freedom is calculated by comparing the current capture point with a capture point that is set in advance. The capture point error calculated is used as a pose error with respect to at least one degree of freedom.

In addition, a position of a certain point on the hip or the upper body is acquired as a current reference point with respect to at least one degree of freedom based on the pose angle and the angles of the plurality of joint parts. A position error of the reference point with respect to at least one degree of freedom is calculated by comparing the current reference point with a target reference point that is set in advance. The position error of the reference point is used as a pose error with respect to at least one degree of freedom.

In addition, a method of calculating a pose error of the remaining translation degree of freedom may be identical to or different from that of the at least one translation degree of freedom.

The pose error with respect to the rotation degree of freedom may be calculated from the difference between the current pose angle and the target pose angle of the robot.

In addition, a compensation force with respect to at least one translation degree of freedom is calculated based on the calculated pose error, and a compensation moment with respect to the rotation degree of freedom (Operation 904).

A first virtual gravity with respect to the calculated compensation force is set, and a second virtual gravity is set according to the current FSM state (Operation 905).

Gravity compensation torques required to compensate for the first virtual gravity, the second virtual gravity, and actual gravity are calculated (Operation 906).

A final target torque is calculated by adding a torque required to generate the compensation moment at the plurality of joint parts of the robot to the calculated gravity compensation torque (Operation 907).

Finally, the final target torque is output to the plurality of joint parts (Operation 908), thereby controlling the balance of the robot.

Figure 10:
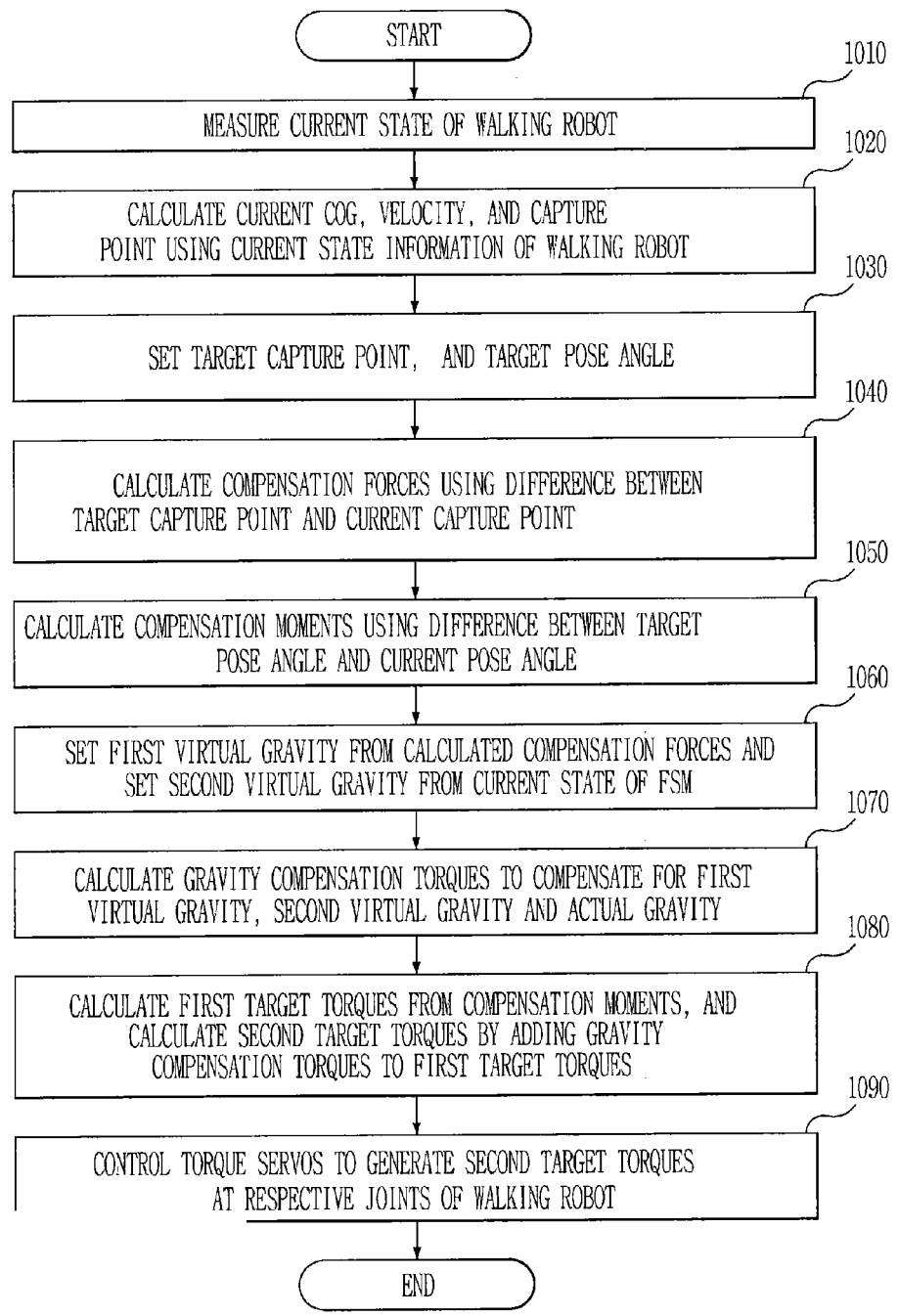
FIG. 10 is a flowchart illustrating a control method of a robot, which represents a pose of the robot with respect to a translation degree of freedom by use of a capture point.

FIG. 10 is a flowchart illustrating a control method of a robot, which represents a pose of the robot with respect to a translation degree of freedom.

Referring to FIG. 10, first, the sensor unit 300 measures current state information of the robot 100 (Operation 1010). The current state information of the robot 100 may include the pose angle measured by the pelvis link 16, information whether or not the feet of the robot 100 contact the ground, the torques of the respective joints, the angles of the respective joints, etc., and the present disclosure is not limited thereto.

Thereafter, the kinematics calculation unit 310 calculates position and velocity of the current COG using the current state information of the robot 100, and calculates the position of the current capture point of the robot 100 in a three dimensional space by Equation 1 below using the calculated position and velocity of the COG (Operation 1020).

$$CP = dCOG + w*vCOG \qquad \text{[Equation 1]}$$

CP represents the capture point, dCOG represents the COG, and vCOG represents a velocity of the COG. w may be acquired by calculating $w=\sqrt{(h/g)}$. Here, h is a height of the COG from the ground, and g is the acceleration of gravity. If the capture point is assumed to be limited on the two dimensional horizontal plane or the ground, the two dimensional capture points may be obtained by taking x and y from coordinates (x, y, z) of CP obtained through Equation 1.

In a case that the position of the robot with respect to three dimensional translation degrees of freedom is represented using a capture point, the three dimensional capture point (see Equation 1) may be used. In a case that the position of the robot with respect to two axes translation degrees of freedom except to the z axis is represented using a capture point, the two dimensional capture point may be used. In this case, the position of the robot with respect to the z-axis translation degree of freedom may be represented by the position of a certain reference potion, such as the hip height.

Thereafter, the target setting unit 320 sets a target capture point according to the current state of the FSM of the robot 100, and sets a target pose angle (Operation 1030). Although the target hip height may be set randomly, the target hip height may be regularly set according to each state of the FSM. Further, although the target pose angle may be set randomly, the target rotation angles may be set such that the upper body of the robot 100 maintains an erect pose.

Thereafter, the compensation force calculation unit 350 calculates compensation forces required by the respective joints using a difference between the target capture point and the current capture point (Operation 1040). In a case that the capture point is regarded as a point on the ground, compensation forces in the X and Y directions may be calculated from the difference between the target capture point and the current capture point, and compensation force in the Z direction may be calculated from the difference between the target hip height and the current hip height.

In calculation of the compensation forces, on the assumption that a virtual spring is present between the position of the target capture point and the position of the current capture point, Equation 3 below is used.

$$f = k*e \qquad \text{[Equation 3]}$$

e is coordinates representing the difference between the target capture point and the current capture point and is expressed as e=(x', y', z')−(x, y, z). (x', y', z') represent position coordinates of the target capture point, and (x, y, z) represent position coordinates of the current capture point. k represents a virtual spring constant.

Thereafter, the compensation moment calculation unit 340 calculates compensation moments using a differences between the target pose angle and the current pose angle (Operation 1050). Here, under the assumption that virtual springs are present on three axes in the roll, pitch, and yaw directions, the compensation moments are calculated by Equation 7 below.

$$M = k_1 * e_1 \qquad \text{[Equation 7]}$$

$k_1$ represents a virtual spring constant, and $e_1$ represents a difference between a pose angle measured by the IMU 17 and a target pose angle.

Calculation of the compensation forces and calculation of the compensation moments, i.e., Operation 1040 and Operation 1050, may be exchanged.

Thereafter, the first virtual gravity setting unit 361 sets first virtual gravity to the compensation forces, and the second virtual gravity setting unit 362 sets second virtual gravity according to the current state of the FSM of the robot 100 (Operation 1060).

In setting of the first virtual gravity, Equation 2 below is used.

$$g_f = f/m \qquad \text{[Equation 2]}$$

Here, $g_f$ represents the acceleration of first virtual gravity, f represents compensation force calculated by the compensation force calculation unit 350, and m represents the mass of the robot 100.

The second virtual gravity is varied according to states of the FSM, and the method of setting the second virtual gravity has been described above.

Thereafter, the gravity compensation torque calculation unit 390 calculates gravity compensation torques required to compensate for the first virtual gravity, the second virtual gravity, and actual gravity (Operation 1070). The gravity compensation torques are calculated by Equation 4 below.

$$t_0 = -g^T \lfloor Q \{ m_1(^0R_1{}^1r_1 + {}^0p_1) + \qquad \text{[Equation 4]}$$
$$m_2(^0R_2{}^2r_2 + {}^0p_2) + \ldots + m_6(^0R_6{}^6r_6 + {}^0p_6) \} \rfloor$$
$$t_1 = -g^T [^0R_1 Q \{ m_2(^1R_2{}^2r_2 + {}^1p_2) + m_3(^1R_3{}^3r_3 + {}^1p_3) +$$
$$\ldots + m_6(^1R_6{}^6r_6 + {}^1p_6) \}]$$
$$\vdots$$
$$t_5 = -g^T [^0R_5 Q \{ m_6(^5R_6{}^6r_6 + {}^5p_6) \}]$$

Here, t represents gravity compensation torque of each joint, g represents a gravity vector, Q represents a 3×3 matrix, i.e., a cross product calculation of a joint axis, m represents a mass of each link, r represents COG offset of each link, R represents a rotation matrix for relative coordinate transformation between joints, and p represents a relative position vector between the joints.

Thereafter, the target torque calculation unit 400 calculates first target torques required to generate the compensation moments of the respective joints, and calculates second target torques by adding the gravity compensation torques to the first joint torques (Operation 1080).

Finally, the servo control unit 420 controls the respective torque servos to generate the second joint torques at the respective joints (Operation 1090).

A control method of a robot in accordance with another embodiment of the present disclosure may further include distributing of the weight of the upper body of the robot 100 to the right and left legs 110R and 110L during calculation of gravity compensation torques, and may include distributing of compensation moments to the right and left legs 110R and 110L of the robot 100 during calculation of first joint torques to the compensation moments.

Figure 11:
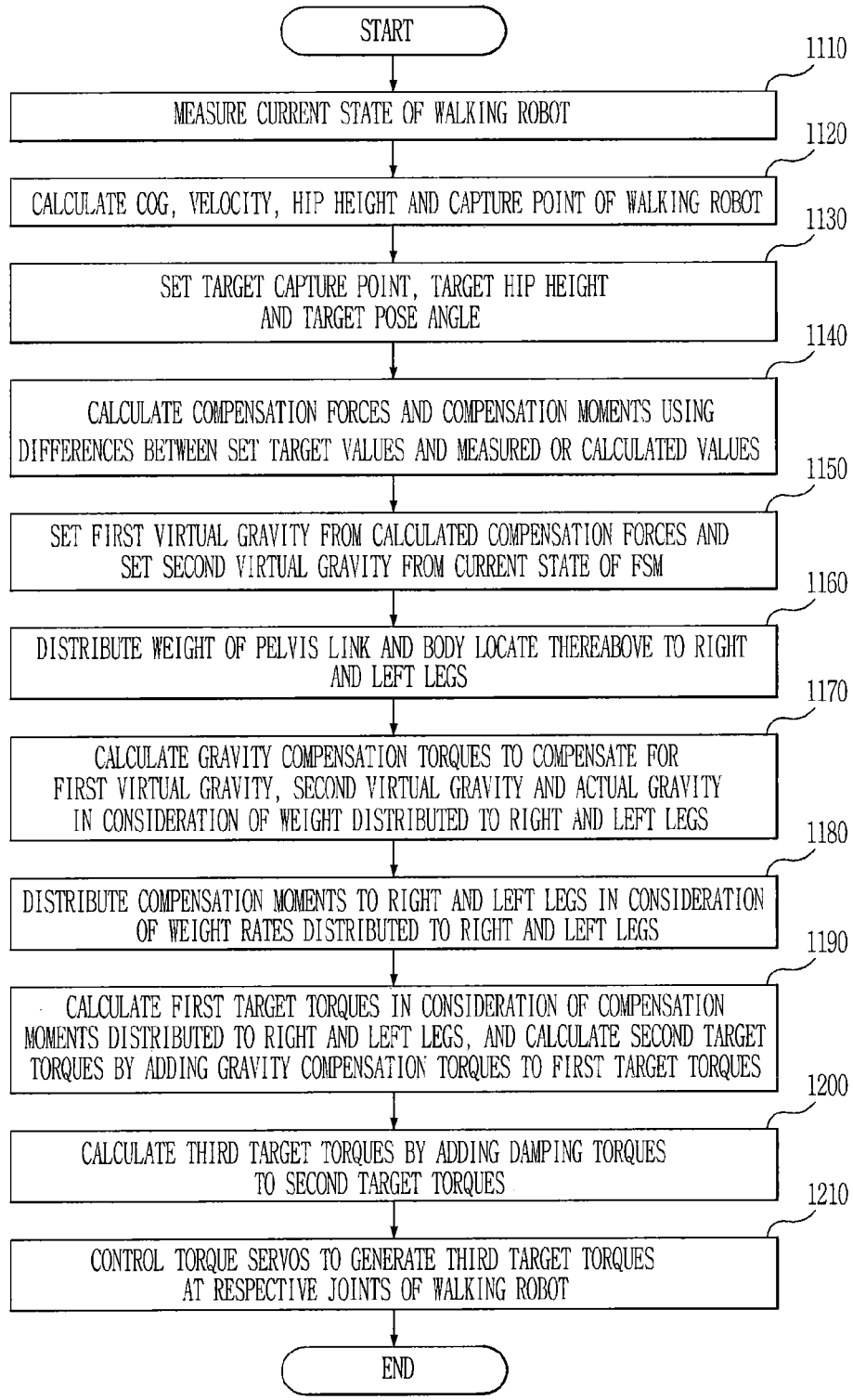
FIG. 11 is a flowchart illustrating a control method of a robot, which further includes a process of distributing compensation moments to the left side leg and the right side leg.

FIG. 11 is a flowchart illustrating the control method of the robot in accordance with this embodiment of the present disclosure. The following embodiment is described in relation that the position of the robot with respect to the translation degree of freedom is represented using the capture point and the hip height.

With reference to FIG. 11, distribution of the weight of the upper body of the robot 100 and distribution of the compensation moments will be described in more detail. The sensor unit 300 measures current state information of the robot 100 (Operation 1110). Further, the kinematics calculation unit 310 calculates the position and velocity of the current COG and a hip height using the current state information of the robot 100 measured by the sensor unit 300 (Operation 1120). The target setting unit 320 sets a target capture point according to the current state of the FSM of the robot 100, and sets a target hip height and a target pose angle (Operation 1130).

Thereafter, the compensation force calculation unit 350 calculates compensation forces in the X and Y directions from the difference between the target capture point and the current capture point, calculates compensation force in the Z direction from the difference between the target hip height and the current hip height, and calculates the compensation moment from the difference between the target pose angle and the current pose angle (Operation 1140).

Thereafter, the virtual gravity setting unit 360 sets first virtual gravity to the compensation forces, and sets second virtual gravity according to the current state of the FSM of the robot 100 (Operation 1150).

Thereafter, the weight distribution unit 380 distributes the weight of the pelvis link 16 and the body (hereinafter, referred to as the torso) 102 located above the pelvis link 16 to the right and left legs 110R and 100L (Operation 1160). With reference to FIG. 7, if the robot 100 is tilted to one side, the COG of the robot 100 is tilted to the same side. Therefore, a large amount of the weight is loaded to a leg closer to the COG. If a distance between the projection point of the COG of the robot 100 on the ground and the left foot 112L of the robot 100 is referred to as $d_L$ and a distance between the projection point of the COG of the robot 100 on the ground and the right foot 112R of the robot 100 is referred to as $d_R$, then weight rates of the pelvis link 16 and torso 102 loaded on the right and left legs 110R and 110L are expressed by Equation 6 below.

$$W_L = d_R/(d_R + d_L)$$

$$W_R = 1 - W_L \qquad \text{[Equation 6]}$$

Here, $W_L$ is a rate of weight loaded on the left leg 110L, and $W_R$ is a rate of weight loaded on the right leg 110R. Weight, calculated by multiplying the mass of the pelvis 16 and the torso 102 by $W_L$, is loaded on the left leg 110L, and weight, calculated by multiplying the mass of the pelvis 16 and the torso 102 by $W_R$, is loaded on the right leg 110R. If the robot 100 is tilted to the right side, as shown in FIG. 7 for example, a larger amount of weight is loaded on the right leg 110R.

Thereafter, the gravity compensation torque calculation unit 390 calculates gravity compensation torques required to compensate for the first virtual gravity and the second virtual gravity in consideration of the weight distributed to the right and left legs 110R and 110L (Operation 1170).

The compensation moment distribution unit 370 distributes compensation moments calculated by the compensation moment calculation unit 340 to the right and left legs 110R and 110L of the robot 100 (Operation 1180). Here, the same distribution rates as the weight distribution rates may be applied. A value, calculated by multiplying the calculated compensation moment by $W_L$ of Equation 6, represents compensation moment distributed to the left leg 110L, and a value, calculated by multiplying the calculated compensation moment by $W_R$ of Equation 6, represents compensation moment distributed to the right leg 110R.

Thereafter, the target torque calculation unit 400 calculates first joint torques required by the respective joints in consideration of the compensation moments distributed to the right and left legs 110R and 110L, and calculates second joint torques by adding the gravity compensation torques calculated by the gravity compensation torque calculation unit 390 to the first joint torques (Operation 1190).

Additionally, for the purpose of stability of the robot 100, the control method of the robot in accordance with this embodiment may further include addition of damping torques resisting in proportion to velocities of the respective joints (Operation 1200). Third target torques may be obtained by adding the damping torques of the respective joints to the second target torques calculated by the target torque calculation unit 400 (Operation 1200). This is expressed by Equation 9 below.

$$t_{3,L} = t_{2,L} + d^*w \quad t_{3,R} = t_{2,R} + d^*w \qquad \text{[Equation 9]}$$

Here, $t_{3,R}$ and $t_{3,L}$ represent third target torques of the right and left legs 110R and 110L, d represents a damping coefficient, and w represents an angular velocity of a joint.

The servo control unit 420 controls the torque servos of the respective joints to generate the calculated third target torques of the respective joints of the right and left legs 110R and 110L at the respective joints (Operation 1210).

As is apparent from the above description, a robot and a control method thereof in accordance with an embodiment of the present disclosure control a capture point obtained by combining the position and velocity of the COG during walking, thereby being capable of maintaining stability and transferring the COG to right or left legs or the front area of the support foot to move forwards.

Further, even when the capture point deviates from the support foot by external force, the swing foot is moved to the capture point and then contacts the ground, thereby allowing the robot to continue to walk without falling.

Further, the pose of the upper body of the robot is controlled regardless of inclination and unevenness of the ground, and thus the robot may stably walk on the inclined or uneven ground without falling.

Further, the robot may execute walking motions using an FSM in consideration of a walking process of a human, thus executing a heel-to-toe motion similar to walking of a human and naturally walking.

Moreover, the robot may walk without bending of knees, thus being capable of walking with a large stride and effectively using energy required while walking.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the walking robot 100 may include at least one processor to execute at least one of the above-described units and methods.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A robot provided with a plurality of legs each having a plurality of joint parts and an upper body connected to the plurality of legs while having a plurality degrees of freedom, the robot comprising:
   a sensor unit to measure state information of the robot;
   a kinematics calculation unit to acquire a current pose of the robot using the measured state information of the robot;
   a target setting unit to set a target pose with respect to at least one of the plurality of degrees of freedom of the robot based on a finite state machine (FSM) of the robot set in advance;
   a compensation force calculation unit to calculate a pose error by comparing the acquired current pose with the set target pose, and calculate a compensation force with respect to the at least one degree of freedom based on the pose error;
   a virtual gravity setting unit to set sizes of virtual gravities required by the plurality of joint parts of the robot, according to the calculated compensation force, and to set sizes of virtual gravities required by the plurality of joint parts of the robot according to a current state of the FSM of the robot;
   a gravity compensation torque calculation unit to calculate gravity compensation torques required to compensate for the virtual gravities set by the virtual gravity setting unit; and
   a servo control unit to output the calculated gravity compensation torques to the plurality of joint parts.

2. The robot of claim 1, wherein the sensor unit comprises:
   a pose detection unit to detect a pose angle of the upper body; and
   an angle detection unit to detect an angle of the plurality of joint parts.

3. The robot of claim 2, wherein the kinematics calculation unit calculates a center of gravity (COG) based on the pose angle of the upper body and the angle of the plurality of joint parts, and acquires the current pose of the robot based on the calculated COG.

4. The robot of claim 2, wherein the kinematics calculation unit calculates a position and velocity of the center of gravity (COG) based on the pose angle of the upper body and the angle of the plurality of joint parts, and acquires the current pose of the robot by calculating a current capture point based on the position and velocity of the COG.

5. The robot of claim 2, wherein the kinematics calculation unit acquires a position of a reference point of a hip or the upper body based on the pose angle of the upper body and the angle of the plurality of joint parts, and acquires the current pose based on the position of the reference point.

6. The robot of claim 3, wherein the target setting unit sets a target COG with respect to the at least one degree of freedom; and set the target pose using the target COG.

7. The robot of claim 4, wherein the target setting unit sets a target capture point with respect to the at least one degree of freedom and sets the target pose using the target capture point.

8. The robot of claim 7, wherein the target setting unit sets the target capture point as a point on a line which passes in a direction of gravity starting from a point within a range supported against a foot of the plurality of legs.

9. The robot of claim 5, wherein the target setting unit sets a target position of the reference point of the hip or the upper body of the robot with respect to the at least one degree of freedom, and sets the target pose based on the target position of the reference point.

10. The robot of claim 7, wherein the kinematics calculation unit further acquires a current hip height of the robot based on the pose angle of the upper body and the angle of the plurality of joint parts, and
   the compensation force calculation unit calculates a capture point error by comparing the current capture point with the target capture point, calculates a hip height error by comparing the current hip height with a target hip height and calculates the compensation force based on the capture point error and the hip height error.

11. The robot of claim 10, wherein the compensation force calculating unit calculates a horizontal direction compensation force using the capture point error and calculates a vertical direction compensation force using the hip height error.

12. The robot of claim 2, wherein the pose angle acquired by the pose detection unit includes at least one of a rotation angle in a roll direction (rotated about an X-axis), a rotation angle of in a pitch direction (rotated about a Y-axis) and a rotation angle in a yaw direction (rotated about a Z-axis) of a pelvis link of the robot, and
   the robot further comprises a joint torque detection unit to measure torques of the plurality of joint parts.

13. The robot of claim 12, wherein the kinematics calculation unit calculates a position of the current capture point of the robot by calculating a position and a velocity of a current center of gravity (COG) and a current hip height of the robot, and combining the position and the velocity of the COG.

14. The robot of claim 13, further comprising an FSM control unit to store the FSM of the robot in advance, to judge a current state of the FSM of the robot and to control transition from the current state to the next state of the FSM according to whether or not the robot satisfies an FSM state transition condition.

15. The robot of claim 14, wherein the target setting unit sets a target capture point based on a current FSM state of the robot, a target pose angle for controlling the upper body of the robot and a target hip height of the robot.

16. The robot of claim 15, further comprising a compensation moment calculation unit to calculate compensation moments required to reach the target pose angle using a difference between the pose angle measured by the sensor unit and the target pose angle set by the target setting unit.

17. The robot of claim 15, wherein the compensation force calculation unit calculates a compensation force in X and Y directions using differences between positions of the current capture point in the X and the Y directions calculated by the kinematics calculation unit and positions of the target capture point in the X and the Y direction set by the target setting unit, and calculates compensation force in a Z direction using a difference between the current hip height of the robot calculated by the kinematics calculation unit and the target hip height of the robot set by the target setting unit.

18. The robot of claim 16, wherein the virtual gravity setting unit sets a size of a virtual gravity according to the current state of the FSM of the robot and a size of a virtual gravity according to the compensation force calculated by the compensation force calculation unit.

19. The robot of claim 16, wherein the virtual gravity setting unit includes:
a first virtual gravity setting unit to set first virtual gravity required by the respective joints of the robot using Equation 2 below, if $g_f$ represents the first virtual gravity, m represents the mass of the robot and f represents the compensation force calculated by the compensation force calculation unit; and
a second virtual gravity setting unit to set second virtual gravity required by the respective joints according to the current state of the FSM of the robot, $$g_f = f/m \qquad \text{[Equation 2]}.$$

20. The robot of claim 19, wherein the gravity compensation torque calculation unit calculates a torque required to compensate for the first virtual gravity, the second virtual gravity, and actual gravity.

21. The robot of claim 20, further comprising a weight distribution unit to calculate distance rates between a projection point of the COG of the robot on the ground and the feet connected to the respective legs, and to allot a larger rate of the mass of the upper body of the robot to a leg closer to the projection point of the COG of the robot on the ground using the calculated distance rates.

22. The robot of claim 21, wherein the gravity compensation torque calculation unit calculates a gravity compensation torque to the first virtual gravity and a gravity compensation torque to the second virtual gravity using the mass of the upper body distributed to the respective legs by the weight distribution unit, and adjusts rates of the gravity compensation torque to the first virtual gravity and the gravity compensation torque to the second virtual gravity according to the current state of the FSM of the robot, thereby calculating gravity compensation torques of the respective joints required to compensate for virtual gravities and actual gravity.

23. The robot of claim 22, further comprising a compensation moment distribution unit to calculate distance rates between a projection point of the COG of the robot on the ground and the feet connected to the plurality of legs, and to distribute the compensation moments calculated by the compensation moment calculation unit to the plurality of legs by allotting a larger value of the compensation moment to a leg closer to the projection point of the COG of the robot on the ground using the calculated distance rates.

24. The robot of claim 23, wherein the target torque calculation unit calculates first target torques required by the plurality of legs of the robot from the compensation moments distributed to the plurality of legs by the compensation moment distribution unit using a Jacobian regarding the feet of the robot as bases.

25. The robot of claim 24, wherein the target torque calculation unit calculates second target torques required by the respective joints of the robot by adding the gravity compensation torques calculated by the gravity compensation torque calculation unit to the first target torques.

26. The robot of claim 25, further comprising a torque compensation unit to calculate third target torques by adding damping torques in proportion to angular velocities of the respective joints to the second target torques calculated by the target torque calculation unit.

27. A method of controlling a robot provided with a plurality of legs each having a plurality of joint parts and an upper body connected to the legs while having a plurality of translation degrees of freedom and a rotation degree of freedom, the control method comprising:
detecting a pose angle of the upper body and angles of the plurality of joint parts;
acquiring a current pose of the robot with respect to at least one of the plurality of translation degrees of freedom based on the detected angles of the plurality of joint parts;
calculating a pose error by comparing the acquired current pose with a target pose set in advance;
calculating a compensation force with respect to the at least one translation degree of freedom based on the pose error;
setting virtual gravities based on the calculated compensation force and a current state of a Finite State Machine (FSM) that is set with respect to the robot in advance;
calculating gravity compensation torques required by the plurality of joint parts of the robot to compensate for the set virtual gravities; and
controlling torque servos of the respective joint parts so that torque values of the respective joints of the robot reach target torques that include the calculated gravity compensation torques.

28. The method of claim 27, wherein the calculating of the pose error comprises:
calculating a position of a current center of gravity (COG) based on the detected pose angle and the angles of the plurality of joint parts, wherein a position of a current COG with respect to the at least one translation degree of freedom is calculated;
calculating a COG error with respect to the at least one translation degree of freedom by comparing the calculated current COG with a target COG that is set in advance; and
using the COG error as the pose error.

29. The method of claim 27, wherein the calculating of the pose error comprises:
detecting a position and velocity of a current center of gravity (COG) based on the detected pose angle and the angles of the plurality of joint parts, wherein a position and velocity of a current COG with respect to the at least one translation degree of freedom is detected;

acquiring a current capture point with respect to the at least one translation degree of freedom based on the detected position and velocity of the current COG;

calculating a capture point error with respect to the at least one translation degree of freedom by comparing the obtained current capture point with a target capture point that is set in advance; and using the capture point error as the pose error.

30. The method of claim 27, wherein the calculating of the pose error comprises:

calculating a position of a reference point of one of a hip and the upper body with respect to the at least one translation degree of freedom based on the detected pose angle and the angles of the plurality of joint parts;

calculating a position error of the reference point with respect to the at least one translation degree of freedom by comparing a position of a current reference point with a position of a target reference point set in advance; and using the position error of the reference point as the pose error of the at least one translation degree of freedom.

31. The method of claim 27, wherein the calculating of the pose error is different from calculating a pose error of the remaining translation degree of freedom among the plurality of translation degrees of freedom.

32. The method of claim 27, wherein the setting of the virtual gravities required by the respective joint parts of the robot comprises:

setting first virtual gravity required by the respective joints of the robot using Equation 2 below, if $g_f$ represents the first virtual gravity, m represents the mass of the robot and f represents the compensation force calculated; and setting second virtual gravity required by the respective joints according to the current state of the FSM of the robot, $$g_f = f/m \quad \text{[Equation 2]}.$$

33. The method of claim 32, wherein the calculating of the gravity compensation torque comprises:

calculating a gravity compensation torque to the first virtual gravity and a gravity compensation torque to the second virtual gravity; and adjusting rates of the gravity compensation torque to the first virtual gravity and the gravity compensation torque to the second virtual gravity according to the current state of the FSM of the robot, thereby calculating gravity compensation torques of the respective joints that are to be provided to the joint parts of the robot.

34. The method of claim 27, further comprising:

setting a target pose angle to maintain a stable pose of the robot; and calculating compensation moments to compensate for a difference between the target pose angle and the detected pose angle.

35. The method of claim 34, further comprising:

calculating first target torques required to supply the calculated compensation moments to the respective joints of the robot; and calculating second target torques by adding the gravity compensation torques to the first target torques, wherein the target torques are the second target torque.

36. The method of claim 35, further comprising calculating third target torques by adding damping torques in proportion to angular velocities of the respective joints to the second target torques calculated, wherein the target torques are the third target torque.

37. The method of claim 35, further comprising calculating distance rates between a projection point of the COG of the robot on the ground and a plurality of feet of the robot, and distributing the calculated compensation moments to the plurality of legs by allotting a larger value of the compensation moment to a leg closer to the projection point of the COG of the robot on the ground using the calculated distance rates.

38. The method of claim 37, wherein the calculating of the first target torques comprises calculating the first target torques required by the plurality of legs of the robot from the compensation moments distributed to the plurality of legs using a Jacobian regarding the feet of the robot as bases.

* * * * *